(12) United States Patent
Suzuki et al.

(10) Patent No.: US 6,819,497 B2
(45) Date of Patent: Nov. 16, 2004

(54) COLOR SEPARATION AND COLOR SYNTHESIS OPTICAL SYSTEM AND REFLECTION TYPE PROJECTION DISPLAY APPARATUS

(75) Inventors: Tetsuji Suzuki, Yokosuka (JP); Shogo Masuda, Hachioji (JP); Ryuuji Akino, Fujisawa (JP); Makoto Ashihara, Yokohama (JP); Takayuki Kashiwagi, Yokohama (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 10/611,194

(22) Filed: Jul. 2, 2003

(65) Prior Publication Data

US 2004/0004769 A1 Jan. 8, 2004

(30) Foreign Application Priority Data

Jul. 5, 2002 (JP) .................................... P2002-197603
Nov. 29, 2002 (JP) .................................... P2002-348120

(51) Int. Cl.[7] ........................ G02B 27/14; G02B 27/12; G02B 5/04; G03B 21/14; G03B 21/00; G02F 1/1335
(52) U.S. Cl. ........................ 359/634; 359/629; 359/628; 359/640; 359/833; 353/20; 353/33; 349/9
(58) Field of Search ................................ 359/618, 629, 359/634, 638, 640, 833; 353/20, 31, 33, 34, 37, 81; 349/5, 7, 8, 9

(56) References Cited

U.S. PATENT DOCUMENTS 5,327,270 A * 7/1994 Miyatake ....................... 349/9
6,183,091 B1   2/2001 Johnson et al. ............... 353/20
6,619,800 B1 * 9/2003 Takezawa et al. ............ 353/20
6,624,860 B1 * 9/2003 Narutaki et al. ............. 349/106
2003/0081315 A1 * 5/2003 Kobayashi .................. 359/495

FOREIGN PATENT DOCUMENTS

JP   2002-228809   8/2002
JP   2002-287094   10/2002

* cited by examiner

Primary Examiner—Georgia Epps
Assistant Examiner—Jack Dinh
(74) Attorney, Agent, or Firm—Nath & Associates PLLC; Gary M. Nath; Marvin C. Berkowitz

(57) ABSTRACT

Disclosed is a color separation and color synthesis optical system provided between a light source portion and a projection optical system in a reflection type projection display apparatus, which color-separates a white color beam emitted from the light source portion into three primary color light beams of R (red), G (green) and B (blue), guides the three primary color light beams to a plurality of spatial light modulators corresponding to R, G and B, and color-synthesizes color light beams optically modulated by the respective spatial light modulators for the colors depending on video signals to emit a color-synthesized light beam, wherein at least one or more wavelength-selective polarization converting plates which rotate a plane of polarization of a specific color light beam by 90 degrees are located, and the wavelength-selective polarization converting plate is adhered to an incidence plane and/or an emission plane of a polarization beam splitter by adhesive with a slight gap.

18 Claims, 15 Drawing Sheets

COLOR SEPARATION AND COLOR SYNTHESIS OPTICAL SYSTEM AND REFLECTION TYPE PROJECTION DISPLAY APPARATUS

BACKGROUND OF THE INVENTION

1. Field of the Invention

The present invention relates to a color separation and color synthesis optical system applied to a reflection type projection display apparatus, and particularly to a color separation and color synthesis optical system capable of suppressing shading occurred for a color image, which is projected onto a screen, due to a difference of thermal expansion coefficients between a wavelength-selective polarization converting plate and a polarization beam splitter, and suppressing a decrease in a contrast ratio owing to an interface reflection light beam of the wavelength selection polarization plate provided on the side where a color-synthesized light beam is emitted.

2. Description of the Related Arts

A projection type display apparatus for projecting a color image is the one which color-separates a white light beam emitted from a light source portion into three primary color light beams of R (red), G (green) and B (blue), guides these three primary color light beams to a spatial light modulators corresponding thereto, and color-synthesizes the three primary color light beams, which have been optically modulated by the spatial light modulators of the three primary colors in accordance with video signals, to project the synthesized color light beam onto a screen, thus allowing the screen to display a color image thereon.

The projection type display apparatus for projecting the color image as described above can be roughly divided into a transmission type projection display apparatus which employs a transmission type spatial light modulator and a reflection type projection display apparatus which employs a reflection type spatial light modulator.

The transmission type projection display apparatus employing the transmission type spatial light modulator can be easily downsized thanks to its relatively simple optical structure. However, the transmission type projection display apparatus has a drawback in its capability for a high resolution performance. On the other hand, though the reflection type projection display apparatus employing the reflection type spatial light modulator has an advantage in its capability for a high resolution performance, this apparatus can not be easily downsized because of its complicated optical structure.

Particularly, the reflection type projection display apparatus employing the reflection type spatial light modulator requires a polarization beam splitter for separating an incident light beam to be radiated onto the reflection type spatial light modulator and a reflected light beam modulated by the reflection type spatial light modulator. At this time, since two or more polarization beam splitters are ordinarily operated for one reflection type spatial light modulator in order to obtain a high contrast color image, this makes the optical structure of the reflection type projection display apparatus complicated.

With respect to such reflection type projection display apparatus employing the reflection type spatial light modulator, a color separation and color synthesis optical system which solves the problem on its optical structure has recently been disclosed with several structural styles by Colorlink Inc. in the United States. For example, refer to the following Non-patent Literature 1, and the following Patent Literature 2.

Non-patent Literature 1: "High Contrast Color Splitting Architecture Using Color Polarization Filters" SID 00DIGEST, 92–95(2000), Michael G. Robinson et al., Patent Literature 2: U.S. Pat. No. 6,183,091B1

FIG. 1 is a plan view illustrating an optical structure of a color separation and color synthesis optical system applied to a reflection type projection display apparatus that is a conventional example disclosed by Colorlink Inc. FIG. 2 is a plan view illustrating an optical structure of a color separation and color synthesis optical system applied to a reflection type projection display apparatus that is another conventional example disclosed by Colorlink Inc.

The reflection type projection display apparatus 1A that is the conventional example illustrated in FIG. 1 is introduced by Colorlink Inc. in the above described Non-patent Literature 1 ("High Contrast Color Splitting Architecture Using Color Polarization Filters" SID 00DIGEST, 92–95(2000), Michael G. Robinson et al.).

The reflection type projection display apparatus, which is the conventional example, constituted of a light source portion 10 for emitting a white light beam; a color separation and color synthesis optical system 30A, which color-separates the white light beam emitted from the light source portion 10 into three primary color light beams of R (red), G (green) and B (blue), guides the three primary color light beams into three spatial light modulators 20R, 20G and 20B corresponding to R, G and B, and emits a color-synthesized light beam obtained by color-synthesizing the three primary color light beams after the three primary color light beams are optically modulated by the spatial light modulators 20R, 20G and 20B depending on video signals; and a projection optical system 40 for projecting the color-synthesized light beam emitted from the color separation and color synthesis optical system 30A.

To be more concrete, the foregoing light source portion 10 is constituted of a reflecting plane mirror 11; a light source 12 using a metal halide lamp, a xenon lamp, a halogen lamp or the like for emitting the white light beam; and a first polarization plate 13 which is provided ahead of the light source 12 and has a transmission axis selected so as to transmit only an s-polarized light beam in the white color light beam therethrough.

Accordingly, when the white light beam from the light source 12 transmits through the first polarization plate 13, Rs, Gs and Bs light beams of three primary colors corresponding to R, G and B are incident onto the color separation and color synthesis optical system 30A provided between the light source portion 10 and the projection optical system 40.

In the following descriptions, the Rs, Gs and Bs light beams of the three primary colors shall show s-polarized light beams respectively corresponding to R, G and B. On the other hand, Rp, Gp and Bp light beams of three primary colors to be described later shall show p-polarized light beams respectively corresponding to R, G and B. At this time, the p and s-polarized light beams are determined based on a relative relation between a plane of polarization of linear polarization and a polarization-splitting plane of a polarization beam splitter onto which the p and s-polarized light beams are incident. When a light beam is in parallel with a paper plane, this light beam is referred to as the p-polarized light beam, and a light beam perpendicular to the p-polarized light beam is referred to as the s-polarized light beam.

The three spatial light modulators 20R, 20G and 20B corresponding to R, G and B use a reflection type liquid crystal panel and the like, and quarter wave plates 21 to 23 are integrally fitted to front planes of the three spatial light modulators (hereinafter, referred to as a reflection type liquid crystal panel) 20R, 20G and 20B. At this time, the quarter wave plates 21 to 23 serve to increase a contrast ratio of images of the respective colors displayed on the reflection type liquid crystal panels 20R, 20G and 20B.

The color separation and color synthesis optical system 30A surrounded by the dotted lines in FIG. 1 is constituted of first to fourth polarization beam splitters 31 to 34 each formed to a rectangular parallelepiped shape (including a regular hexahedron shape), each having approximately the same outside dimension; and first to fourth wavelength-selective polarization converting plates 35 to 38.

Specifically, in the foregoing color separation and color synthesis optical system 30A, first to fourth polarization beam splitters 31 to 34 are located between the light source portion 10 and the projection optical system 40 so as to be separated from each other vertically and horizontally.

In the course of forming each of the first to fourth polarization beam splitters 31 to 34 in such a manner, two triangular prisms formed of optical glass showing no double refraction are jointed to form a rectangular parallelepiped shape, a semi-transmission reflection film which transmits a p-polarized light beam and reflects an s-polarized light beam is formed on one plane of one of the triangular prisms, and another triangular prism is adhered onto the semi-transmission reflection film by use of light transmissivity adhesive, whereby each of polarization separation planes 31a to 34a are formed by the semi-transmission reflection film along a diagonal.

The first to fourth polarization beam splitters 31 to 34 are isolatedly located vertically and horizontally so that the polarization separation planes 31a to 34a intersect to form an approximate X-character shape when viewed from above.

On the right plane side of the second polarization beam splitter 32 located at the top-right position in the drawing, a reflection type liquid crystal panel 20G for G color, to which the quarter wave plate 22 is fitted, is placed so as to face thereto, and, on the left plane side of the third polarization beam splitter 33 located at the bottom-left position in the drawing, a reflection type liquid crystal panel 20B for B color, to which the quarter wave plate 23 is fitted, is placed so as to face thereto. On the lower plane side of the third polarization beam splitter 33, a reflection type liquid crystal panel 20R for R color, to which the quarter wave plate 21 is fitted, is placed so as to face thereto.

Accordingly, in the foregoing color separation and color synthesis optical system 30A, the first polarization beam splitter 31 serves as a member onto which a light beam from the light source portion 10 is incident, and the fourth polarization beam splitter 34 located at the diagonal position to the first polarization beam splitter 31 serves as a member from which a color-synthesized light beam is emitted. The second and third polarization beam splitters 32 and 33 respectively located at the top-right position of the optical system 30A and the bottom-left position of the optical system 30A serve as members for separating incident light beams to be irradiated onto the reflection type liquid crystal panels 20R, 20G and 20B and reflection light beams optically modulated by the reflection type liquid crystal panels 20R, 20G and 20B.

A first wavelength-selective polarization converting plate (phase plate for G color) 35 having a function to rotate the plane of polarization of the G color light beam by 90 degrees is located between the light source portion 10 and the left plane side of the first polarization beam splitter 31. A second wavelength-selective polarization converting plate (phase plate for R color) 36 having a function to rotate the plane of polarization of the R color light beams by 90 degrees is located between the lower plane side of the first polarization beam splitter 31 and the upper plane side of the third polarization beam splitter 33. A third wavelength-selective polarization converting plate (phase plate for the R color) 37 having a function to rotate the plane of polarization of the R color light beam by 90 degrees is located also between the right plane side of the third polarization beam splitter 33 and the left plane side of the fourth polarization beam splitter 34. A fourth wavelength-selective polarization converting plate (phase plate for G color) 38 is also located between the right plane side of the fourth polarization beam splitter 34 and the projection optical system 40.

The foregoing projection optical system 40 is provided at the rear stage of the fourth wavelength-selective polarization converting plate (phase plate for the G color) 38 installed in the color separation and color synthesis optical system 30A, and constituted of a second polarization plate 41 having a transmission axis selected so as to transmit only a linear polarized light beam therethrough, which has a relation of a p-polarized light beam relative to the polarization separation plane 34a of the fourth polarization beam splitter 34; and a projection lens 42 which magnifies and projects a color image light beam.

Herein, an operation of the projection display apparatus 1A having the above described structure, which is the conventional example, will be described.

The white light beam emitted from the light source 12 in the light source portion 10, which is an indefinite polarized light beam, is first incident onto the first polarization plate 13, and only the s-polarized light beam transmits through the first polarization plate 13. Then, the Rs, Gs and Bs light beams of the s-polarized light beam, which correspond to the R, G and B colors, are incident onto the first wavelength-selective polarization converting plate (phase plate for G color) 35 in the color separation and color synthesis optical system 30A.

At this time, as described above, the first wavelength-selective polarization converting plate 35 is the phase plate for the G color, which rotates the plane of polarization only for the G color light beam by 90 degrees. Accordingly, when the Gs light beam of the s-polarized light beam transmits through the first wavelength-selective polarization converting plate 35, the Gs light beam is polarized and converted to the Gp light beam of the p-polarized light beam. Since the first wavelength-selective polarization converting plate (phase plate for G color) 35 does not act on the Rs and Bs light beams of the s-polarized light beam at all, the Rs and Bs light beams transmit intactly through the first wavelength-selective polarization converting plate 35.

Then, the Gp light beam polarized and converted by the first wavelength-selective polarization converting plate (phase plate for the G color) 35 transmits through the polarization separation plane 31a of the first polarization beam splitter 31, and travels straightly to be incident onto the second polarization beam splitter 32. Thereafter, the Gp light beam transmits straightly through the polarization separation plane 32a of the second polarization beam splitter 32, and is incident onto the reflection type liquid crystal panel 20G for the G color, which has the quarter wave plate 22 facing the right side plane of the second polarization beam splitter 32.

Furthermore, in the reflection type liquid crystal panel 20G for the G color, the Gp light beam from the second polarization beam splitter 32 undergoes optical modulation depending on a video signal corresponding to the G color, and becomes the Gs light beam of an s-polarized light beam component generated after being optically modulated. Thus, the Gs light beam is emitted from the reflection type liquid crystal panel 20G.

Thereafter, the Gs light beam from the reflection type liquid crystal panel 20G is sequentially reflected by the polarization separation planes 32a and 34a of the second and fourth polarization beam splitters 32 and 34, and is incident onto the fourth wavelength-selective polarization converting plate (phase plate for G color) 38 located behind the right side plane of the fourth polarization beam splitter 34. Herein, as described above, since the fourth wavelength-selective polarization converting plate 38 is the phase plate for the G color, which has the function to rotate the plane of polarization of the G color light beam by 90 degrees, the Gs light beam of the s-polarized light beam is polarized and converted by the fourth wavelength-selective polarization converting plate 38 to the Gp light of the p-polarized light beam, and emitted to the projection optical system 40 side.

The Rs light beam of the s-polarized light beam, which has transmitted through the first wavelength-selective polarization converting plate (phase plate for G color) 35, is reflected by the polarization separation plane 31a of the first polarization beam splitter 31, and is incident onto the second wavelength-selective polarization converting plate (phase plate for R color) 36 located on the lower plane side of the first polarization beam splitter 31. Herein, since the second wavelength-selective polarization converting plate 36 is the phase plate for the R color, which has the function to rotate the plane of polarization of the R color light beam by 90 degrees, the Rs light beam of the s-polarized light beam is polarized and converted to the Rp light beam of the p-polarized light beam, and incident onto the third polarized light splitter 33 located below the second wavelength-selective polarization converting plate 36.

Thereafter, the Rp light beam straightly transmits through the polarization separation plane 33a of the third polarization beam splitter 33, and is incident onto the reflection type liquid crystal panel 20R for the R color, which has the quarter wave plate 21 facing the bottom side plane of the third polarization beam splitter 33. Moreover, in the reflection type liquid crystal panel 20R for the R color, the Rp light beam from the third polarization beam splitter 33 undergoes optical modulation depending on the video signal corresponding to the R color, and becomes the Rs light beam of the s-polarized light beam component generated after being optically modulated. This Rs light beam is emitted from the reflection type liquid crystal panel 20R.

Thereafter, the Rs light beam from the reflection type liquid crystal panel 20R is reflected by the polarization separation plane 33a of the third polarization beam splitter 33, and is incident onto the third wavelength-selective polarization converting plate (phase plate for the R color) 37 located on the right side plane of the third polarization beam splitter 33. Herein, as described above, since the third wavelength-selective polarization converting plate 37 is the phase plate for the R color, the Rs light beam of the s-polarized light beam is polarized and converted, and incident onto the fourth polarization beam splitter 34.

The Rp light beam of the p-polarized light beam straightly transmits through the polarization separation plane 34a of the fourth polarization beam splitter 34, and is incident onto the fourth wavelength-selective polarization converting plate (phase plate for G color) 38 located at the rear stage of the right side plane of the fourth polarization beam splitter 34. Herein, as described above, since the fourth wavelength-selective polarization converting plate 38 is the phase plate for the G color, the fourth wavelength-selective polarization converting plate 38 does not act on the Rp light beam at all, and the Rp light beam is emitted on the projection optical system 40 side intactly.

The Bs light beam of the s-polarized light beam that has transmitted through the first wavelength-selective polarization converting plate (phase plate for G color) 35 is reflected by the polarization separation plane 31a of the first polarization beam splitter 31, and is incident onto the second wavelength-selective polarization converting plate (phase plate for the R color) 36 located on the lower plane side of the first polarization beam splitter 31. Herein, as described above, since the second wavelength-selective polarization converting plate 36 is the phase plate for the R color, the second wavelength-selective polarization converting plate 36 does not act on the Bs light beam at all, and the Bs light beam is incident onto the third polarization beam splitter 33 intactly.

The Bs light beam is reflected by the polarization separation plane 33a of the third polarization beam splitter 33, and incident onto the reflection type liquid crystal panel 20B for the B color, which has the quarter wave plate 23 facing the left side plane of the third polarization beam splitter 33. Furthermore, in the reflection type liquid crystal panel 20B for the B color, the Bs light beam from the third polarization beam splitter 33 undergoes optical modulation depending on a video signal corresponding to the B color, and becomes the Gp light beam of a p-polarized light beam component generated after being optically modulated. Thus, the Gp light beam is emitted from the reflection type liquid crystal panel 20B.

Thereafter, the Bp light beam from the reflection type liquid crystal panel 20B straightly transmits through the polarization separation plane 33a of the third polarization beam splitter 33, and is incident onto the third wavelength-selective polarization converting plate (phase plate for R color) 37 located on the right side plane of the third polarization beam splitter 33. Herein, as described above, since the third wavelength-selective polarization converting plate 37 is the phase plate for the R color, the third wavelength-selective polarization converting plate 37 does not act on the Bp light beam at all, and the Bp light beam is incident onto the fourth polarization beam splitter 34 intactly.

Furthermore, the Bp light beam straightly transmits through the polarization separation plane 34a of the fourth polarization beam splitter 34, and is incident onto the fourth wavelength-selective polarization converting plate (phase plate for the R color) 38 located at the rear stage of the right side plane of the fourth polarization beam splitter 34. Herein, as described above, since the fourth wavelength-selective polarization converting plate 38 is the phase plate for the G color, the fourth wavelength-selective polarization converting plate 38 does not act on the Bp light beam at all, and the Bp light beam is emitted on the projection optical system 40 side intactly.

Then, the Rp, Gp and Bp light beams are emitted from the fourth wavelength-selective polarization converting plate 38 in a state where their planes of polarization are aligned with the p-polarized light beam, and thereafter a color-synthesized light beam obtained by color-synthesizing the Rp, Gp and Bp light beams transmits sequentially through the second polarization plate 41 and the projection lens 42 in the projection optical system 40. Thus, the color-synthesized light beam is magnified and displayed on a screen (not shown) as a color image.

As described above, according to the projection display apparatus 1A that is the conventional example, a relatively simple optical structure can be achieved, and a high contrast color image can be obtained on a screen (not shown).

Next, a reflection type projection display apparatus 100A that is another conventional example illustrated in FIG. 2 is disclosed in the Patent Literature2 (U.S. Pat. No. 6,183,091B1 gazette) by Colorlink Inc.

The reflection type projection display apparatus 100A that is the conventional example is constituted of a light source portion 110 for emitting a white light beam; a color separation and color synthesis optical system 130A which color-separates the white light beam emitted from the light source portion 110 into three primary color light beams of R (red), G (green) and B (blue), guides these three primary color light beams to a spatial light modulators 120R, 120G and 120B corresponding to R (red), G(green) and B(blue) respectively, and emits a color-synthesized light beam obtained by color-synthesizing the three primary color light beams, which have been optically modulated by the spatial modulation elements 120R, 120G and 120B of the three primary colors in accordance with video signals; and a projection optical system 140 for projecting the color-synthesized light beam emitted from the color separation and color synthesis optical system 130A.

To be more specific, the foregoing light source portion 110 is constituted of a reflecting plane mirror 111; a light source 112 using a metal halide lamp, a xenon lamp, a halogen lamp or the like for emitting the white light beam; and a polarization plate 113 which is provided ahead of the light source 112 and has a transmission axis selected so as to transmit only an s-polarized light beam in the white light beam therethrough.

Accordingly, when the white light beam from the light source 112 transmits through the polarization plate 113, Rs, Gs and Bs light beams of an s-polarized light beam corresponding to R, G and B are incident onto the color separation and color synthesis optical system 130A provided between the light source portion 110 and the projection optical system 140.

The foregoing three spatial light modulators 120R, 120G and 120B use a reflection type liquid crystal panel and the like, and quarter wave plates 121 to 123 are integrally fitted to front planes of the three spatial light modulators (hereinafter, referred to as a reflection type liquid crystal panel) 120R, 120G and 120B. At this time, the quarter wave plates 121 to 123 serve to increase a contrast ratio of images of the respective colors displayed on the reflection type liquid crystal panels 120R, 120G and 120B.

The color separation and color synthesis optical system 130A surrounded by the dotted lines in FIG. 2 is constituted of one polarization beam splitter 131 formed to a rectangular parallelepiped shape (including a regular hexahedron shape); one dichroic prism 132 formed to a rectangular parallelepiped shape (including a regular hexahedron shape); one optical glass block 133 formed to a rectangular parallelepiped shape (including a regular hexahedron shape); and two, first and second, wavelength-selective polarization converting plates 134 and 135 formed to a plane shape. At this time, the outside dimensions of the polarization beam splitter 131, the dichroic prism 132 and the optical glass block 133 are set to be approximately equal in size.

Specifically, in the foregoing color separation and color synthesis optical system 130A, one polarization beam splitter 131 is located to face the left side plane thereof to the light source portion 110 and to face the lower side plane thereof to the projection optical system 140 when the light source portion 110 and polarization beam splitter 140 are in orthogonal position and one dichroic prism 132 is located so as to be adjacent to the upper side plane of the polarization beam splitter 131. Moreover, one optical glass block 133 is located so as to be adjacent to the right side plane of the polarization beam splitter 131.

In the course of forming of the above mentioned polarization beam splitter 131 in such a manner that two triangular prisms formed of optical glass showing no double refraction are jointed to form a rectangular parallelepiped shape, a semi-transmission reflection film which transmits a p-polarized light beam and reflects an s-polarized light beam is formed on one plane of one of the two triangular prisms, and another triangular prism is adhered onto the semi-transmission reflection film by use of light transmissivity adhesive, whereby a polarization separation plane 131a is formed along a diagonal by the semi-transmission reflection film.

In the course of forming the dichroic prism 132 in such a manner that two triangular prisms formed of optical glass showing no double refraction are jointed to form a rectangular parallelepiped shape, a semi-transmission film which transmits B color light beams (a Bs light beam and a Bp light beam) and reflects R color light beams (a Rs light beam and a Rp light beam) is formed on one plane of one of the two triangular prisms, and another triangular prism is adhered onto the semi-transmission reflection film by use of light transmissivity adhesive, whereby a dichroic half mirror plane 132a is formed along a diagonal by the semi-transmission reflection film.

The foregoing optical glass block 133 is formed to a rectangular parallelepiped shape by use of optical glass showing no double refraction.

The polarization beam splitter 131 and the dichroic prism 132 are located adjacently so that the polarization separation plane 131a of the polarization beam splitter 131 and the dichroic half mirror plane 132a of the dichroic prism 132 are approximately parallel when viewed from above.

On the right plane side of the dichroic prism 132, a reflection type liquid crystal panel 120R for R color, to which the quarter wave plate 121 is fitted, is placed so as to face thereto, and, on the upper plane side of the dichroic prism 132 a reflection type liquid crystal panel 120B for B color, to which the quarter wave plate 123 is fitted, is placed so as to face thereto. On the right plane side of the optical glass block 133, a reflection type liquid crystal panel 120G for G color, to which the quarter wave plate 22 is fitted, is placed so as to face thereto.

Accordingly, in the foregoing color separation and color synthesis optical system 130A, the polarization beam splitter 131 serves as a member on a light incident side/light emission side, and the dichroic prism 132 and the optical glass block 133 serve as members for separating incident light beams to be radiated onto the reflection type liquid crystal panels 120R, 120G and 120B and reflection light beams modulated by the reflection type liquid crystal panels 120R, 120G and 120B.

Still furthermore, a first wavelength-selective polarization converting plate (phase plate for G color) 134 having a function to rotate the plane of polarization of the G color light beam by 90 degrees is located between the light source portion 110 and the left side plane of the first polarization beam splitter 131. A second wavelength-selective polarization converting plate (phase plate for G color) 135 having a function to rotate the plane of polarization of the G color light beams by 90 degrees is also located between the lower side plane of the polarization beam splitter 131 and the projection optical system 140.

The foregoing projection optical system 140 is provided at the rear stage of the second wavelength-selective polarization converting plate (phase plate for the G color) 135 installed in the color separation and color synthesis optical system 130A. The projection optical system 140 is provided with a projection lens 141 to magnify and display a color image.

Herein, an operation of the projection display apparatus 100A having the above described structure, which is another conventional example, will be described.

The white light beam emitted from the light source 112 in the light source portion 110, which is an indefinite polarized white light beam, is first incident onto the polarization plate 113, and only the s-polarized light beam transmits through the polarization plate 113. Then, the Rs, Gs and Bs light beams of the s-polarized light beam, which correspond to the R, G and B colors respectively, are incident onto the wavelength-selective polarization converting plate (phase plate for G color) 134 in the color separation and color synthesis optical system 130A.

At this time, as described above, the wavelength-selective polarization converting plate 134 is the phase plate for the G color, which rotates the plane of polarization only for the G color light beam. Accordingly, when the Gs light beam of the s-polarized light beam transmits through the wavelength-selective polarization converting plate 134, the Gs light beam is polarized and converted to the Gp light beam of a p-polarized light beam. Since the wavelength-selective polarization converting plate (phase plate for G color) 134 does not act on the Rs and Bs light beams of the s-polarized light beam at all, the Rs and Bs light beams transmit intactly through the wavelength-selective polarization converting plate 134.

Then, the Gp light beam polarized and converted by the wavelength-selective polarization converting plate (phase plate for G color) 134 transmits through the polarization separation plane 131a of the polarization beam splitter 131, and travels straightly to be incident into the optical glass block 133. Thereafter, the Gp light beam is incident onto the reflection type liquid crystal panel 120G for the G color, which has the quarter wave plate 122 facing the right side plane of the optical glass block 133. The Gp light beam from the optical glass block 133 undergoes optical modulation depending on a video signal corresponding to the G color in the reflection type liquid crystal panel 120G for the G color, and becomes the Gs light beam of an s-polarized light beam component generated after being optically modulated. Thus, the Gs light beam is emitted from the reflection type liquid crystal panel 120G.

Furthermore, the Gs light beam from the reflection type liquid crystal panel 120G transmits through the optical glass block 133, and is reflected by the polarization separation plane 131a of the polarization beam splitter 131. Then, the Gs light beam is incident onto the second wavelength-selective polarization converting plate (phase plate for G color) 135 which is located on the lower plane side of the polarization beam splitter 131. Herein, as described above, since the second wavelength-selective polarization converting plate 135 is the phase plate for the G color, which rotates the plane of polarization of the G color light beam by 90 degrees, the Gs light beam of the s-polarized light beam is polarized and converted to a Gp light beam of a p-polarized light beam by the second wavelength-selective polarization converting plate 132, and emitted onto the projection optical system 140 side.

The Rs light beam of the s-polarized light beam, which has transmitted through the first wavelength-selective polarization converting plate (phase plate for G color) 134, is reflected by the polarized light beam plane 131a of the polarization beam splitter 131, and enters the dichroic prism 132 above the polarization beam splitter 131. Thereafter, the Rs light beam is reflected by the dichroic half mirror plane 132a of the dichroic prism 132, and incident onto the reflection type liquid crystal panel 120R for the R color, which has the quarter wave plate 121 facing the right plane side of the dichroic prism 132.

The Rs light beam from the dichroic prism 132 undergoes optical modulation depending on a video signal corresponding to the R color in the reflection type liquid crystal panel 120R for the R color, and becomes the Rp light beam of a p-polarized light beam component generated after being optically modulated. Thus, the Rp light beam is emitted from the reflection type liquid crystal panel 120R. Thereafter, the Rp light beam from the reflection type liquid crystal panel 120R is reflected by the dichroic half mirror plane 132a of the dichroic prism 132, and enters the polarization beam splitter 131 below the dichroic prism 132 again. Thereafter, the Rp light beam transmits through the polarization separation plane 131a of the polarization beam splitter 131, and is incident onto the second wavelength-selective polarization converting plate (phase plate for G color) 135 located on the lower plane side of the polarization beam splitter 131 straightly. Herein, as described above, since the second wavelength-selective polarization converting plate 135 is the phase plate for the G color, the second wavelength-selective polarization converting plate 135 does not act on the Rp light beams at all, and the Rp light beam is emitted into the projection optical system 140 side intactly.

The Bs light beam of the s-polarized light beam, which has transmitted through the first wavelength-selective polarization converting plate (phase plate for G color) 134, is reflected by the polarization separation plane 131a of the polarization beam splitter 131, and enters the dichroic prism 132 above the polarization beam splitter 131. Thereafter, the Rs light beam transmits through the dichroic half mirror plane 132a of the dichroic prism 132, and straightly enters the reflection type liquid crystal panel 120B for the B color, which has the quarter wave plate 123 facing the upper side plane of the dichroic prism 132.

The Bs light beam from the dichroic prism 132 undergoes optical modulation depending on a video signal corresponding to the B color in the reflection type liquid crystal panel 120B for the B color, and becomes the Bp light beam of a p-polarized light beam component generated after being optically modulated. Thus, the Bp light beam is emitted from the reflection type liquid crystal panel 120B. Thereafter, the Bp light beam from the reflection type liquid crystal panel 120B transmits through the dichroic half mirror plane 132a of the dichroic prism 132, and straightly enters the polarization beam splitter 131 below the dichroic prism 132 again. Thereafter, the Bp light beam transmits through the polarization separation plane 131a of the polarization beam splitter 131, and is straightly incident onto the second wavelength-selective polarization converting plate (phase plate for G color) 135 located on the lower plane side of the polarization beam splitter 131. Herein, as described above, since the second wavelength-selective polarization converting plate 135 is the phase plate for the G color, the second wavelength-selective polarization converting plate 135 does not act on the Bp light beams at all, and the Bp light beam is emitted into the projection optical system 140 side intactly.

Subsequently, the Rp, Gp and Bp light beams are emitted from the second wavelength-selective polarization converting plate 135 in a state where their planes of polarization are aligned with the p-polarized light beam, and thereafter a color-synthesized light beam obtained by color-synthesizing the Rp, Gp and Bp light beams is magnified and displayed on a screen (not shown) as a color image.

As described above, according to the projection display apparatus 100A that is another conventional example, a relatively simple optical structure can be achieved, and a high contrast color image can be obtained on a screen (not shown).

Incidentally, when the color separation and color synthesis optical systems 30A and 130A, which are the conventional examples respectively, are applied to the reflection type projection display apparatus 1A and 100A, a high contrast color image is obtained on a screen (not shown).

Herein, in order to obtain a color image with a higher image quality by adopting a part of a technical concept as to the color separation and color synthesis optical system 30A and 130A, which are the conventional examples, it is necessary to improve "a resister deviation" by adhering the wavelength-selective polarization converting plate provided by at least one in the color separation and color synthesis optical system 30A or 130A and the polarization beam splitter facing thereto, unlike the conventional example, and necessary to raise a lamp output of the light source 12 or 112 provided in the light source portion 10 or 110. However, when it is intended to obtain a brighter color image on a screen (not shown) by the above manner, there has been a problem that shading occurs for the projected color image.

At this time, when the cause of the foregoing shading is investigated, since optical energy is made stronger by the increase of the lamp output of the light source 12 or 112, temperature of an optical member, onto which a white light beam from the light source 12 or 112 in the color separation and color synthesis optical system 30A or 130A is incident, rises, and a difference of a thermal expansion between the at least one wavelength-selective polarization converting plate located one on a light beam incident side of the light source portion 10 or 110 and the polarization beam splitter adhered to the wavelength-selective polarization converting plate so as to face thereto is caused, and it was proved that shading for the projected color image occurs owing to the difference of the thermal expansion.

Moreover, when the wavelength-selective polarization converting plate is provided on a side for emitting the color-synthesized light beam obtained by color-synthesizing the colors from the reflection type liquid crystal panels for the R, G and B colors in the color separation and color synthesis optical system, a problem that the contrast ratio decreases due to the interface reflection light beam of the wavelength-selective polarization converting plate has occurred.

SUMMARY OF THE INVENTION

As to a color separation and color synthesis optical system applied to a reflection type projection apparatus, a color separation and color synthesis optical system has been desired, which is capable of suppressing shading which, in a color image projected on a screen, is caused due to a difference of a thermal expansion between a wavelength-selective polarization converting plate and a polarization beam splitter, and capable of suppressing a decrease in a contrast ratio occurred by an interface reflection light beam of a wavelength-selective polarization converting plate provided on a side from which a color-synthesized light beam is emitted. Accordingly, an object of the present invention is to provide such color separation and color synthesis optical system.

To achieve the foregoing object, there is provided a color separation and color synthesis optical system provided between a light source portion and a projection optical system in a reflection type projection display apparatus including the light source portion, a plurality of spatial light modulators and the projection optical system, the color separation and color synthesis optical system, including: a color separation optical system having a first polarization beam splitter for color-separating a white light beam emitted from the light source portion into a plurality of color light beams; a color synthesis optical system having a second polarization beam splitter for color-synthesizing the color light beams emitted from the plurality of spatial light modulators and emitting a color-synthesized light beam; and a wavelength-selective polarization converting plate which rotates a plane of polarization of a specific color light beam by 90 degrees, the wavelength-selective polarization converting plate being adhered to at least one of incidence and emission planes, onto/from which a light beam is incident/emitted, of at least one of the first and second polarization beam splitters, with a small gap by adhesive.

In a preferable embodiment of the present invention, an external periphery of the wavelength-selective polarization converting plate and an external periphery of the at least one of the incidence planes and the emission planes are adhered by speckles of adhesive.

In a preferable embodiment of the present invention, a reflection reduction coating is applied to a plane of the wavelength-selective polarization converting plate exposed to the air.

Furthermore, to achieve the foregoing object, there is provided a color separation and color synthesis optical system provided between a light source portion and a projection optical system in a reflection type projection display apparatus including the light source portion, a plurality of spatial light modulators and the projection optical system, the color separation and color synthesis optical system, including: a color separation optical system having a first polarization beam splitter for color-separating a white light beam emitted from the light source portion into a plurality of color light beams; a color synthesis optical system having a second polarization beam splitter for color-synthesizing the color light beams emitted from the plurality of spatial light modulators and emitting a color-synthesized light beam; a wavelength-selective polarization converting plate which rotates a plane of polarization of a specific color light beam by 90 degrees; and a frame which supports the wavelength-selective polarization converting plate, the frame being adhered to at least one of incidence and emission planes, onto/from which a light beam is incident/emitted, of at least one of the first and second polarization beam splitters by adhesive.

In a preferable embodiment of the present invention, an external periphery of the frame and an external periphery of the at least one of the incidence and emission planes are adhered by speckles of adhesive.

In a preferable embodiment of the present invention, a reflection reduction coating is applied to a plane of the wavelength-selective polarization converting plate exposed to the air.

To achieve the foregoing object, there is provided with a reflection type projection display apparatus including: a light source portion; a color separation optical system having a first polarization beam splitter for color-separating a white light beam emitted from the light source portion into a plurality of color light beams; a plurality of spatial light modulators for optically modulating the plurality of color light beams depending on video signals; a color synthesis optical system having a second polarization beam splitter for color-synthesizing the color light beams emitted from the plurality of spatial light modulators and emitting a color-synthesized light beam; a wavelength-selective polarization converting plate which rotates a plane of polarization of a specific color light beam by 90 degrees, the wavelength-selective polarization converting plate being adhered to at least one of incidence and emission planes, onto/from which a light beam is incident/emitted, of at least one of the first and second polarization beam splitters, with a small gap by adhesive; and a projection optical system for projecting the color-synthesized light beam emitted from the color synthesis optical system.

In a preferable embodiment of the present invention, an external periphery of the wavelength-selective polarization converting plate and an external periphery of the at least one of the incidence and emission planes are adhered by speckles of adhesive.

In a preferable embodiment of the present invention, a reflection reduction coating is applied to a plane of the wavelength-selective polarization converting plate exposed to the air.

Furthermore, to achieve the foregoing object, there is provided with a reflection type projection display apparatus including: a light source portion; a color separation optical system having a first polarization beam splitter for color-separating a white light beam emitted from the light source portion into a plurality of color light beams; a plurality of spatial light modulators for optically modulating the plurality of color light beams depending on video signals; a color synthesis optical system having a second polarization beam splitter for color-synthesizing the color light beams emitted from the plurality of spatial light modulators and emitting a color-synthesized light beam; a wavelength-selective polarization converting plate which rotates a plane of polarization of a specific color light beam by 90 degrees; a frame for supporting the wavelength-selective polarization converting plate; and a projection optical system for projecting the color-synthesized light beam emitted from the color synthesis optical system, wherein the frame is adhered to at least one of incidence and emission planes, onto/from which a light beam is incident/emitted, of at least one of the first and second polarization beam splitters by adhesive.

In a preferable embodiment of the present invention, an external periphery of the frame and an external periphery of the at least one of the incidence and emission planes are adhered by speckles of adhesive.

In a preferable embodiment of the present invention, a reflection reduction coating is applied to a plane of the wavelength-selective polarization converting plate exposed to the air.

The nature, principle and utility of the invention will become more apparent from the following detailed description when read in conjunction with the accompanying drawings.

DESCRIPTION OF THE PREFERRED EMBODIMENTS

Embodiments of a color separation and color synthesis optical apparatus according to the present invention will be described in the order of a first embodiment and a second embodiment with reference to FIG. 3 to FIG. 16.

<First Embodiment>

Figure 3:
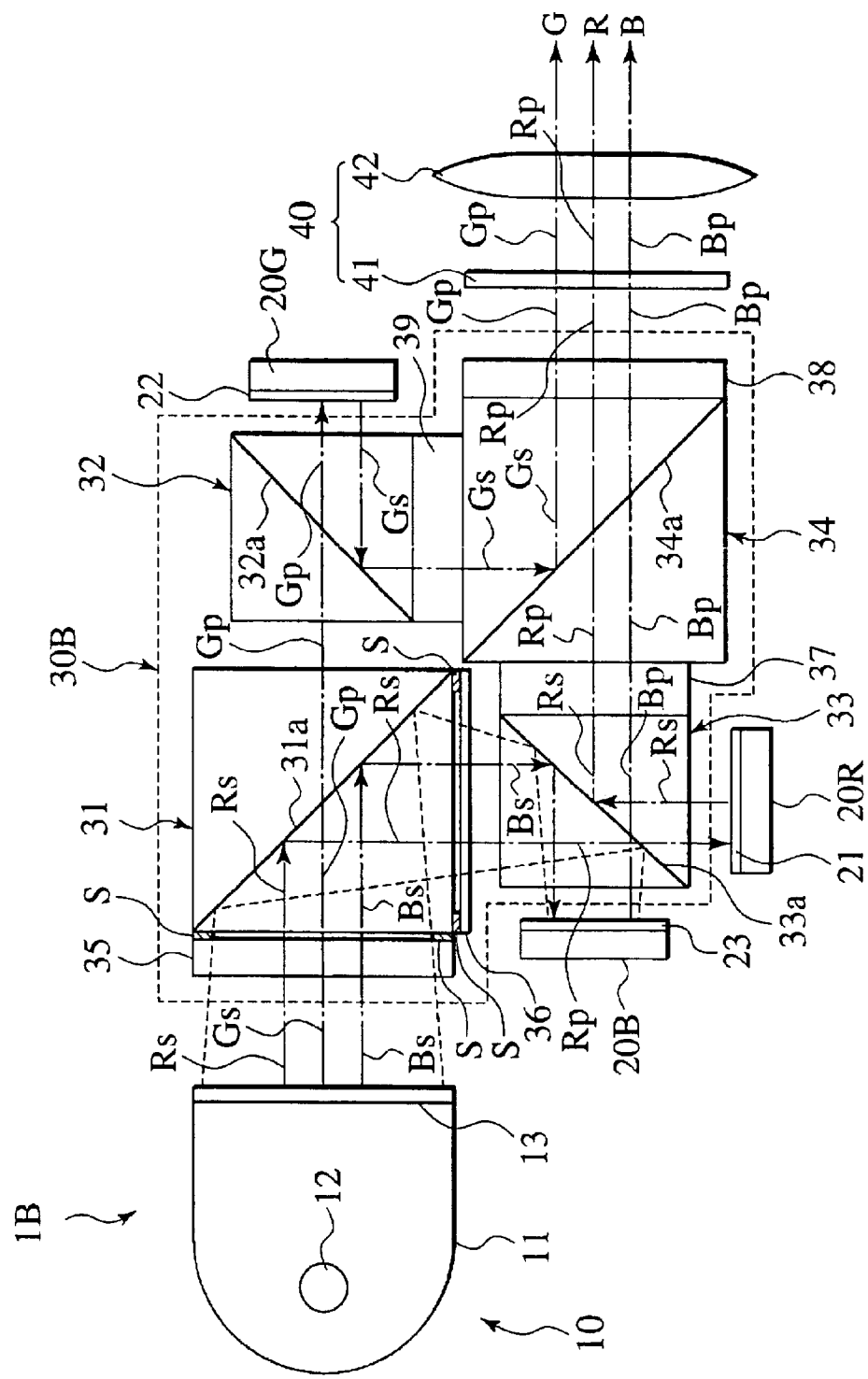
FIG. 3 is a plan view showing a case where a color separation and color synthesis optical system of a first embodiment according to the present invention is applied to a reflection type projection display apparatus.
Figure 4:
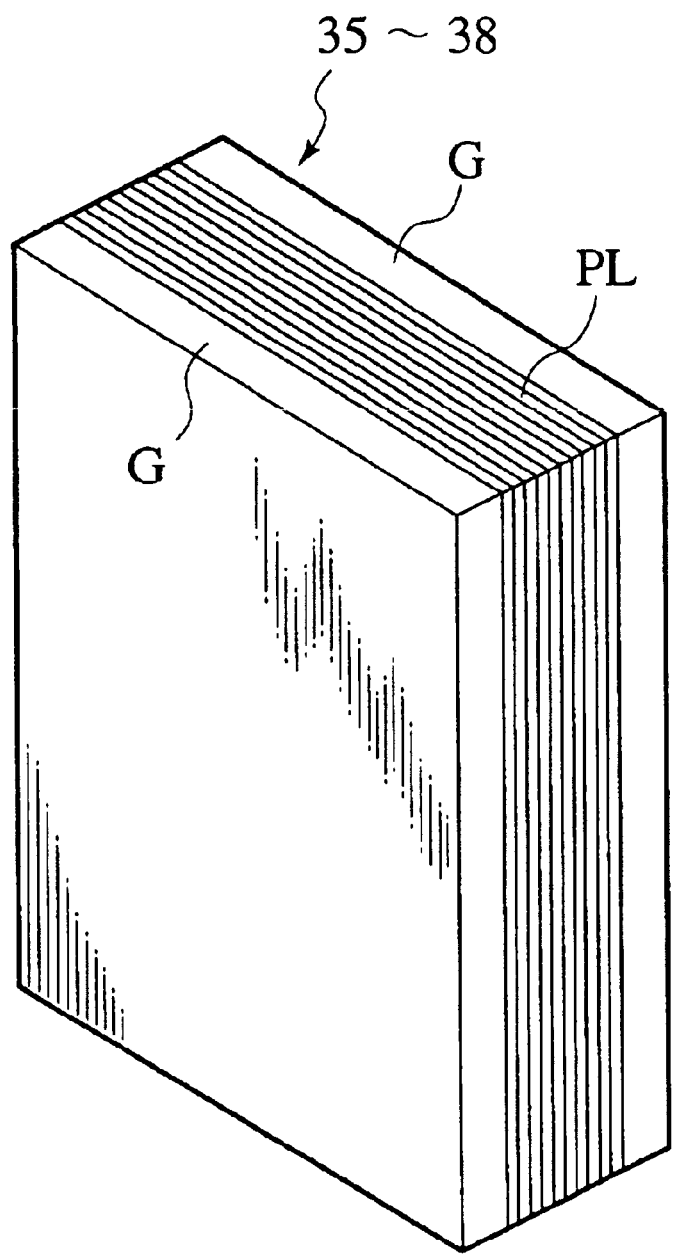
FIG. 4 is a perspective view showing an example of a wavelength-selective polarization converting plate in the color separation and color synthesis optical system of the first embodiment according to the present invention.
Figure 5:
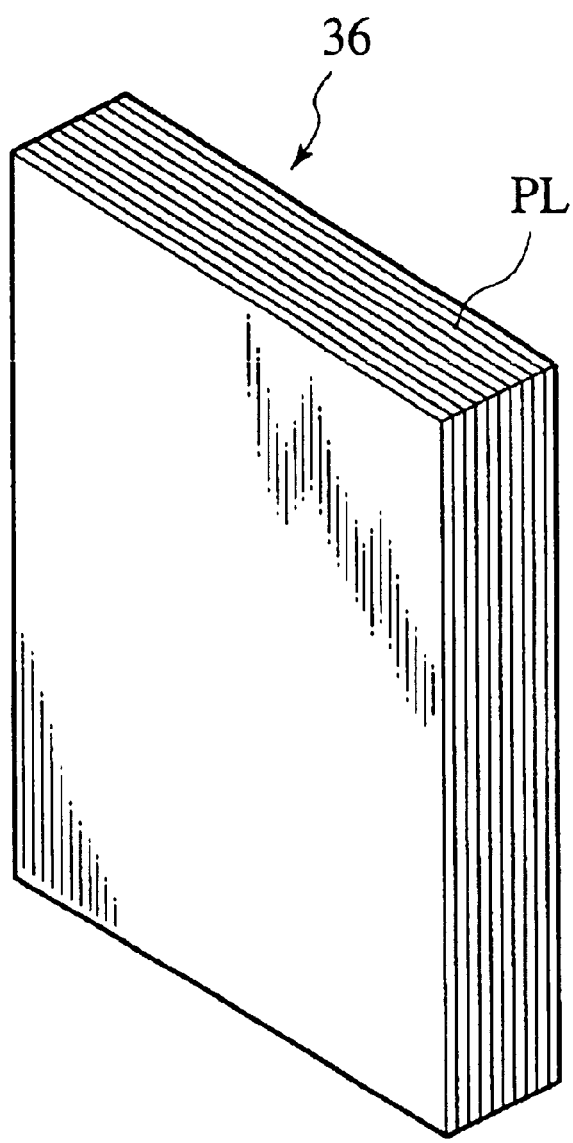
FIG. 5 is a perspective view showing another example of the wavelength-selective polarization converting plate in the color separation and color synthesis optical system of the first embodiment according to the present invention.
Figure 6:
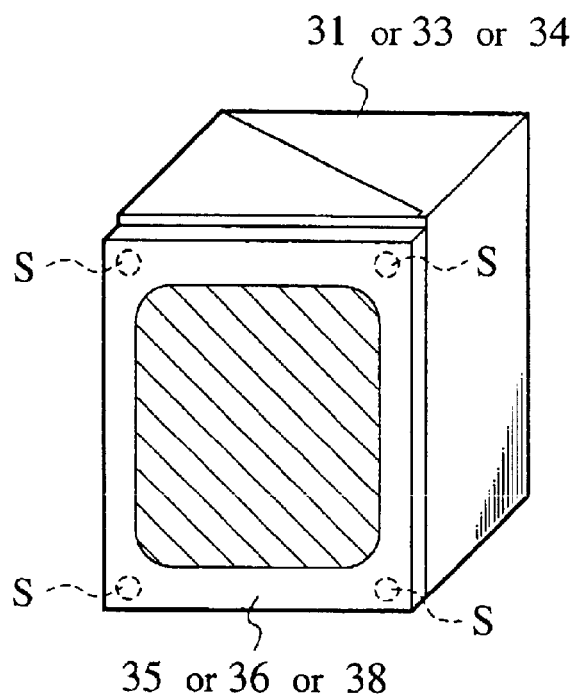
FIG. 6 is a perspective view showing a first mode when the wavelength-selective polarization converting plate is adhered to a polarization beam splitter in the color separation and color synthesis optical system of the first embodiment according to the present invention.
Figure 7:
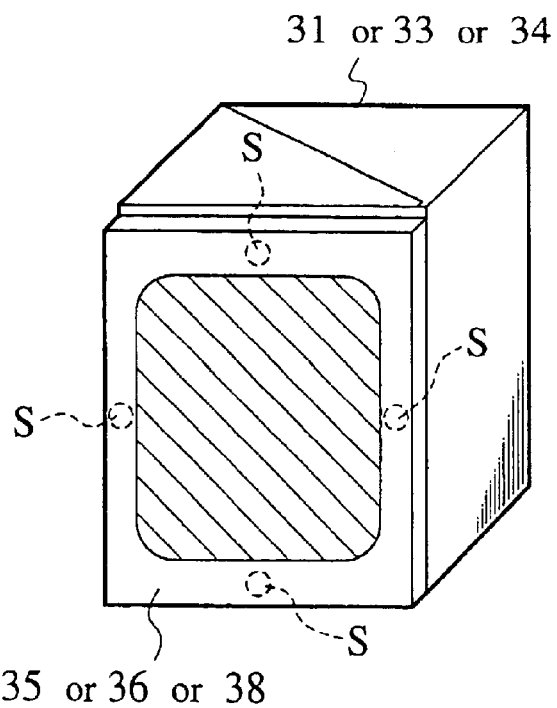
FIG. 7 is a perspective view showing a second mode when the wavelength-selective polarization converting plate is adhered to a polarization beam splitter in the color separation and color synthesis optical system of the first embodiment according to the present invention.

FIG. 3 is a plan view showing a case where a color separation and a color synthesis optical system of a first embodiment according to the present invention is applied to a reflection type projection display apparatus. FIG. 4 is a perspective view showing an example of a wavelength-selective polarization converting plate in the color separation and color synthesis optical system of the first embodiment according to the present invention. FIG. 5 is a perspective view showing another example of the wavelength separation polarization conversion plate in the color separation and color synthesis optical system of the first embodiment according to the present invention. FIG. 6 is a perspective view showing a first mode when the wavelength-selective polarization converting plate is adhered to a polarization beam splitter in the color separation and color synthesis optical system of the first embodiment according to the present invention. FIG. 7 is a perspective view showing a second mode when the wavelength-selective polarization converting plate is adhered to the polarization beam splitter in the color separation and color synthesis optical system according to the present invention.

Figure 1:
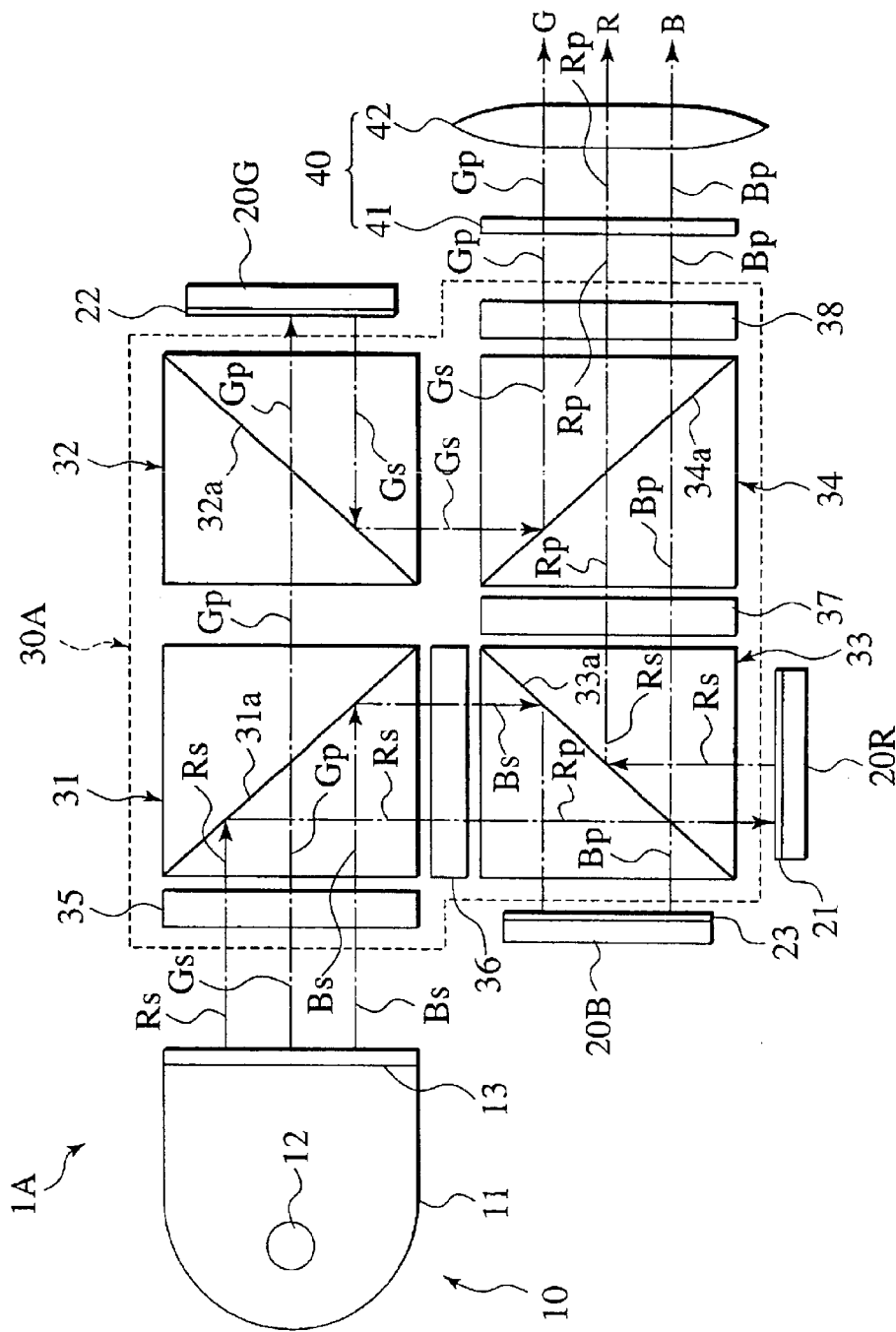
FIG. 1 is a plan view showing an optical structure of a color separation and color synthesis optical system applied to a reflection type projection display apparatus which is a conventional example disclosed by Colorlink. Inc.

The color separation and color synthesis optical system 30B of the first embodiment according to the present invention is obtained by partially modifying the color separation and color synthesis optical system 30A which is the conventional example described using FIG. 1. For the sake of explanation, the same reference numerals and symbols are appended to constituent components of the color separation and color synthesis optical system 30B, which have the same functions as those of the constituent components of the color separation and color synthesis optical system 30A described in the conventional example, and descriptions for them will be described appropriately. New reference numerals and symbols are appended to constituent components different from those of the conventional example, and descriptions for them will be performed.

As shown in FIG. 3, the color separation and color synthesis optical system 30B of the first embodiment according to the present invention is applied to a reflection type projection display apparatus 1B.

The reflection type projection display apparatus 1B is constituted of a light source portion 10 for emitting a white light beam; a color separation and color synthesis optical system 30B, which color-separates the white light beam emitted from the light source portion 10 into three primary color light beams of R (red), G (green) and B (blue), guides the three primary color light beams into three spatial light modulators (hereinafter, referred to as a reflection type liquid crystal panel) 20R, 20G and 20B corresponding to R, G and B, and emits a color-synthesized light beam obtained by color-synthesizing the three primary color light beams after the three primary color light beams are optically modulated by the reflection type liquid crystal panels 20R, 20G and 20B depending on video signals; and a projection optical system 40 for projecting the color-synthesized light beam emitted from the color separation and color synthesis optical system 30B. A light source portion 10 comprising a reflecting plane mirror 11, a light source 12 and a first polarization plate 13, and a projection optical system 40 comprising a second polarization plate 41 and a projection lens 42 are quite the same as those in the conventional examples, and detailed descriptions for them are omitted.

Specifically, the color separation and color synthesis optical system 30B of the first embodiment is provided between the light source portion 10 and the projection optical system 40, and the color separation and color synthesis optical system 30B surrounded by the dotted lines in FIG. 3 is provided with first to fourth polarization beam splitters 31 to 34 formed to a rectangular parallelepiped shape (including a regular hexahedron shape); first to fourth wavelength-selective polarization converting plates 35 to 38 each formed to a plane shape; and newly added one optical glass spacer 39 having a rectangular parallelepiped shape.

Furthermore, in the foregoing color separation and color synthesis optical system 30B, the first polarization beam splitter 31 is also located at a position facing the light source portion 10, second polarization beam splitter 32 is located on the right plane side of the first polarization beam splitter 31, and the third polarization beam splitter 33 is located on the lower plane side of the first polarization beam splitter 31. The fourth polarization beam splitter 34 is located on the lower plane side of the second polarization beam splitter 32 and on the right plane side of the third polarization beam splitter 33 so as to face the projection optical system 40. On this point, the arrangement of the color separation and color synthesis optical system 30B is the same as that of the color separation and color synthesis optical system 30A which is the conventional example shown in FIG. 1.

Polarization separation planes 31a to 34a formed of a semi-transmission reflection film which transmits a p-polarized light beam and reflects an s-polarized light beam are formed along the respective diagonals in the first to fourth polarization beam splitters 31 to 34, and the first to fourth polarization beam splitters 31 to 34 are located vertically and horizontally so that the polarization separation planes 31a to 34a intersect to form an approximate X-character shape when viewed from above. On this point, the arrangement of the first to fourth polarization beam splitters 31 to 34 is the same as that of the first to fourth polarization beam splitters 31 to 34 of the conventional example shown in FIG. 1.

A first wavelength-selective polarization converting plate (phase plate for G color) 35 having a function to rotate the plane of polarization of the G color light beam by 90 degrees is located between the light source portion 10 and the left plane side of the first polarization beam splitter 31. A second wavelength-selective polarization converting plate (phase plate R color) 36 having a function to rotate the plane of polarization of the R color light beams by 90 degrees is located between the lower plane side of the first polarization beam splitter 31 and the upper plane side of the third polarization beam splitter 33. On this point, the arrangement of the first and second wavelength-selective polarization converting plates 35 and 36 is the same as that of the first and second wavelength selection polarization plates 35 and 36 of the conventional example shown in FIG. 1.

A third wavelength-selective polarization converting plate (phase plate for R color) 37 having a function to rotate the plane of polarization of the R color light beam by 90 degrees is also located between the right plane side of the third polarization beam splitter 33 and the left plane side of the fourth polarization beam splitter 34. A fourth wavelength-selective polarization converting plate (phase plate for G color) 38 having a function to rotate the plane of polarization of the G color by 90 degrees is also located between the right plane side of the fourth polarization beam splitter 34 and the projection optical system 40. On this point, the arrangement of the third and fourth wavelength-selective polarization converting plates 37 and 38 is the same as that of the third and fourth wavelength-selective polarization converting plates 37 and 38 of the conventional examples shown in FIG. 1.

The differences in the color separation and color synthesis optical system 30B of the first embodiment from that of the conventional example shown in FIG. 1 will be described. The second and third polarization beam splitters 32 and 33 among the first to fourth polarization beam splitters 31 to 34 are formed to be more compact-sized than that of the conventional example shown in FIG. 1. Along with the compact-sized second and third polarization beam splitters 32 and 33, it is possible to locate, outside the dotted lines surrounding the color separation and color synthesis optical system 30B with a good space efficiency, a reflection type liquid crystal panel 20G for G color, which is arranged so as to face the right side plane of the second polarization beam splitter 32, a reflection type liquid crystal panel 20B for B color, which is arranged so as to face the left side plane of the third polarization beam splitter 33, and a reflection type liquid crystal panel 20 R for R color, which is arranged so as to face the bottom side plane of the third polarization beam splitter 33. Therefore, the reflection type projection display apparatus 1B is made more downsized than the conventional example shown in FIG. 1.

The first polarization beam splitter 31, among the first to fourth polarization beam splitters 31 to 34, is provided isolatedly from the second to fourth polarization beam splitters 32 to 34 in a state where the first polarization beam splitter 31 adheres the first wavelength-selective polarization converting plate (phase plate for G color) 35 on the left side plane thereof, onto which a light beam from the light source portion 10 is incident, by use of adhesive S having a light transmissivity property (hereinafter, referred to as light transmissivity adhesive) with a small gap, and the first polarization beam splitter 31 adheres the second wavelength-selective polarization converting plate (phase plate for R color) 36 on the lower side plane thereof, from which the light beam is emitted, by use of the light transmissivity adhesive S with a small gap.

On the contrary, the second to fourth polarization beam splitters 32 to 34 are united in the following manner. Specifically, an optical glass spacer 39 is closely contacted between the second and fourth polarization beam splitters 32 and 34 to be adhered thereto by use of the light tramsmissivity adhesive (not shown), a third wavelength-selective polarization converting plate (phase plate for R color) 37 is closely contacted between the third and fourth polarization beam splitters 33 and 34 to be adhered thereto by use of the light transmissivity adhesive (not shown), and a fourth wavelength-selective polarization converting plate (phase plate for G color) 38 is closely contacted to the right side plane of the fourth polarization beam splitter 34 to be adhered thereto by use of the light transmissivity adhesive (not shown). Thus, the second to fourth polarization beam splitters 32 to 34 are stabilized against "resister deviation" of the color image.

At this time, in the unlikely event that the first and second wavelength-selective polarization converting plates 35 and 36 adhered to the first polarization beam splitter 31 cause worse performance, since the second to fourth polarization beam splitters 32 to 34 are united and separated from the first polarization beam splitter (light incidence-side polarization beam splitter) 31, parts of only the polarization beam splitter 31 side may be replaced causing no troubles to the second to fourth polarization beam splitters 32 to 34 united by use of prisms formed of expensive optical glass, a service cost decreases, and optical properties can be previously measured at least on the polarization beam splitter 31 side.

In the first embodiment and modification examples 1 to 5 (see FIGS. 8 to 12) of the first embodiment to be described later, a structure form that is one example shown in FIG. 4 is adopted for the first to fourth wavelength-selective polarization converting plates 35 to 38, or a structure form that is another example shown in FIG. 5 is adopted for the second wavelength-selective polarization converting plate 36.

To be concrete, the first to fourth wavelength-selective polarization converting plates 35 to 38 shown in FIG. 4 adopt the structure form that is one example, which is formed in the following manner. Organic films made of transparent polycarbonate or the like are laminated by about ten layers while making each phase thereof different from others, thus forming a polycarbonate laminate body PL of a thickness of about 1 mm, which has a plane shape matching the outside dimension of the first to fourth polarization beam splitters 31 to 34, and optical glass plates G and G of a thickness of about 0.5 mm are closely contacted to the front and rear planes of the polycarbonate laminate body PL to be adhered thereto by a light transmissivity adhesive (not shown), thus sandwiching the polycarbonate laminate body between the two optical glass plates G and G.

At this time, a function to rotate the plane of polarization for the R color light beam or the G color light beam by 90 degrees is obtained depending on a lamination state of the organic films used for the polycarbonate laminate body PL. Furthermore, since a thermal expansion coefficient of the polycarbonate laminate body PL is different from that of the first to fourth polarization beam splitters 31 to 34, the two optical glass plates G and G serve as a buffer member against thermal expansion of the polycarbonate laminate body PL by adhering the optical glass plate G and G to the front and rear planes of the polycarbonate laminate body PL, when the first to fourth wavelength-selective polarization converting plates 35 to 38 are respectively adhered to the first to fourth polarization beam splitters 31 to 34.

Next, the second wavelength-selective polarization converting plate 36 shown in FIG. 5 is formed of only the foregoing polycarbonate laminate body PL. In this case, a single part structure capable of easily absorbing the thermal expansion of the polycarbonate laminate body PL is adopted. Specifically, when the second wavelength-selective polarization converting plate 36 is formed of only the polycarbonate laminate body PL, since the optical glass plates G and G are not adhered to the front and rear planes of the polycarbonate laminate body PL, the polycarbonate laminate body PL itself freely expands and contracts even if a thermal stress occurs. Accordingly, because the difference of the thermal stress between the center portion of the polycarbonate laminate body PL and the periphery portion thereof becomes small, this single part structure absorbs the thermal expansion more easily than the structure form in which the polycarbonate laminate body PL is sandwiched between the two optical glass plates G and G.

Herein, when the temperature of the first to fourth polarization beam splitters 31 to 34 was measured in the color separation and color synthesis optical system 30B to investigate the cause of occurrence of shading in the projected color image, the temperature of the first polarization beam splitter 31 onto which all of the three primary color light beams before color separation is incident was highest because light energy is highest on the side of the first polarization beam splitter 31 onto which the white color beam from the light source portion 10 is incident. The temperature of the third polarization beam splitter 33 onto which the B color light beam is incident was second highest, and the temperature of the second polarization beam splitter 32 onto which the G color light beam is incident was the third. The temperature of the fourth polarization beam splitter 34 on the light emission side was the lowest.

In other words, the wavelength of a blue (B) color area among a visible light beam shows the highest heat generation due to light absorption for each optical member, and the heat generation is particularly high at the position where the blue (B) color concentrates. Accordingly, the degree of temperature rise becomes lower according to the order of the first to fourth polarization beam splitters 31, 33, 32 and 34 attributed to the optical paths of the R, G and B color light beams described above in FIG. 1.

Based on the degree of the temperature rise, the following fact was proved. Specifically, the first wavelength-selective polarization converting plate (phase plate for G color) 35 located between the light source portion 10 and the left side plane of the first polarization beam splitter 31 and the second wavelength-selective polarization converting plate (phase plate for R color) 36 located between the lower side plane of the first polarization beam splitter 31 and the upper side plane of the third polarization beam splitter 33 cause a deformation due to the difference of a thermal expansion between the first and third polarization beam splitters 31 and 33 and evenness is apt to be lowered. This causes shading for the projected color image.

Accordingly, when the first wavelength-selective polarization converting plate (phase plate for G color) 35 is adhered to the left side plane of the first polarization beam splitter 31 located on the light source portion 10 side, the structure form that is the example in which the polycarbonate laminate body PL is sandwiched by the two glass plates G and G shown in FIG. 4 is used as the first wavelength-selective polarization converting plate 35, and, as shown in the enlarged perspective view of FIG. 6, the light transmissivity adhesive S fills between the positions at the four corners of the external periphery of the first wavelength polarization conversion plate 35 and the positions at the four corners of the external periphery of the left side plane of the first polarization beam splitter 31, which correspond to the positions at the four corners of the external periphery of the first wavelength polarization conversion plate 35, in the form of column of the thickness of, for example, about 0.3 mm and the diameter of, for example, about 1 mm. Thus, the first wavelength-selective polarization converting plate 35 is adhered to the left side plane of the first polarization beam splitter 31 with a slight gap of about 0.3 mm.

At this time, the light transmissivity adhesive S fills the positions of the four corners of the external periphery of each of the first wavelength-selective polarization converting plate 35 and the first polarization beam splitter 31 as a position where the incident light beam from the light source portion 10 is not disturbed to travel on the optical path. However, the positions to be filled with the light transmissivity adhesive S are not to be limited to the four corners of the external periphery, and, as shown in the enlarged perspective view of FIG. 7, the adhesion of the first wavelength-selective polarization converting plate 35 and the first polarization beam splitter 31 may be performed by filling the light transmissivity adhesive S at a plurality of positions in the middle points of the external peripheries thereof in the form of column of the thickness of, for example, about 0.3 mm and the diameter of, for example, about 1 mm.

The thickness of the light transmissivity adhesive S, that is, the thickness of the gap, was set to, for example, 0.3 mm, as a proper thickness in the first embodiment. At this time, when the thickness of the light transmissivity adhesive S is too thin, the reflection type projection display apparatus has a blind spot about dew condensation. On the other hand, when the thickness of the light transmissivity adhesive S is too thick, dusts are apt to enter. Furthermore, in order to fix the first wavelength-selective polarization converting plate 35 to the left side plane of the first polarization beam splitter 31 stably, a quantity of the light transmissivity adhesive S has to be increased, and the diameter of the light transmissivity adhesive S has to be made large. This brings about a disadvantage in a cost of the adhesive and a curing time. Accordingly, the thickness of the light transmissivity adhesive S should be preferably set to a range from 0.2 mm to 0.5 mm.

Furthermore, in consideration for a proper elasticity, a light transmissivity adhesive having a shore hardness (D type) ranging from 30 to 70 may be selected. This shore hardness can be selected from this range depending on the degree of the temperature rise on the optical system to which the adhesive is applied. The shore hardness (D type) of a range from 50 to 70 should be preferably selected in consideration for a balance between retention of a fitting attitude of the first wavelength-selective polarization converting plate 35 and elasticity.

Accordingly, since the light transmissivity adhesive S has the elasticity, the light transmissivity adhesive S absorbs a deformation of the first wavelength-selective polarization converting plate 35 due to a thermal expansion, and suppresses occurrence of a thermal stress in an effective incident area in the first wavelength-selective polarization converting plate 35 onto which the white light beam from the light source portion 10 is incident. Accordingly, it is possible to suppress occurrence of shading for the projected color image. Moreover, by filling the light transmissivity adhesive S in the plurality positions between the first wavelength-selective polarization converting plate 35 and the first polarization beam splitter 31 in the form of column, the high temperature of the first polarization beam splitter 31 having large heat quantity is hardly transmitted to the first wavelength selection polarization plate 35. Therefore, the thermal expansion of the first wavelength-selective polarization converting plate 35 is suppressed, and the occurrence of the shading for the projected color image can be suppressed.

Next, when the second wavelength-selective polarization converting plate (phase plate for R color) 36 is adhered to the lower side plane of the first polarization beam splitter 31 located on the light source portion 10 side, the laminate structure form that is another example in which the second wavelength-selective polarization converting plate 36 is formed of only by the polycarbonate laminate body PL as shown in FIG. 5 is used as the second wavelength-selective polarization converting plate 36, and, as shown in the enlarged perspective view of FIG. 6, the light transmissivity adhesive S fills between the positions at the four corners of the external periphery on the lower side plane of the first polarization beam splitter 31 and the positions at the four corners of the external periphery of the second wavelength-selective polarization converting plate 36, which correspond to the positions at the four corners of the external periphery on the lower side plate of the first polarization beam splitter 31, in the form of column of the thickness of, for example, about 0.3 mm and the diameter of, for example, about 1 mm. Thus, the second wavelength-selective polarization converting plate 36 is adhered to the lower side plane of the first polarization beam splitter 31 with a slight gap of about 0.3 mm.

At this time, the light transmissivity adhesive S fills the positions of the four corners of the external periphery of each of the second wavelength-selective polarization converting plate 36 and the first polarization beam splitter 31 as a position where the emission light beam emitted from the lower side plane of the first polarization beam splitter 31 is not disturbed to travel on the optical path. However, the positions filled with the light transmissivity adhesive S are not to be limited to the four corners of the external periphery, and, as shown in the enlarged perspective view of FIG. 7, the adhesion of the second wavelength-selective polarization converting plate 36 and the first polarization beam splitter 31 may be performed by filling the light transmissivity adhesive S at a plurality of positions in the middle points of the external peripheries thereof in the form of column of the thickness of, for example, about 0.3 mm and the diameter of, for example, about 1 mm.

Furthermore, the thickness of the light transmissivity adhesive S should be preferably set to a range from 0.2 to 0.5 mm for the second wavelength-selective polarization converting plate 36 similar to the first wavelength-selective polarization converting plate 35, and the light transmissivity adhesive S having a shore hardness (D type) ranging from 30 to 70 may be selected.

When the positions of the external periphery of the second wavelength-selective polarization converting plate 36 are adhered to the positions of the external periphery on the lower side plane of the first polarization beam splitter 31 by the light transmissivity adhesive S with a slight gap of about 0.3 mm, the light transmissivity adhesive S has elasticity also in this case. Therefore, the light transmissivity adhesive S absorbs the deformation of the second wavelength-selective polarization converting plate 36 due to the thermal expansion, and suppresses occurrence of a thermal stress in an effective incident area in the second wavelength-selective polarization converting plate 36 onto which the emission light beam from the lower side plane of the first polarization beam splitter 31 is incident. Accordingly, it is possible to suppress the occurrence of the shading for the projected color image.

Moreover, by filling the light transmissivity adhesive S in the plurality of positions between the second wavelength-selective polarization converting plate 36 and the first polarization beam splitter 31 in the form of column, the high temperature of the first polarization beam splitter 31 having the large heat quantity is hardly transmitted to the second wavelength selection polarization plate 36. Therefore, the thermal expansion of the second wavelength-selective polarization converting plate 36 is suppressed, and the occurrence of the shading for the projected color image can be suppressed.

In addition, it is possible to surely obtain the effective incident area for the emission light beam from the lower side plane of the first polarization beam splitter 31 by adhering the second wavelength-selective polarization converting plate 36 to the lower side plane of the first polarization beam splitter 31 which is larger in size than the second polarization beam splitter 32.

Since the operation of the color separation and color synthesis optical system 30B of the first embodiment according to the present invention constituted as set out above is the same as that of the conventional example shown in FIG. 1 with respect to the functions of the constituent components, the diagram of the optical paths for the R, G and B color light beams is illustrated in FIG. 3, and reference should be made to the descriptions of the conventional example shown in FIG. 1 for detailed descriptions of this embodiment.

Accordingly, Modification Examples 1 to 5 in which the color separation and color synthesis optical system 30B of the first embodiment according to the present invention is partially modified will be briefly described with reference to FIGS. 8 to 13 while focusing on different things from the color separation and color synthesis optical system 30B of the first embodiment.

Figure 8:
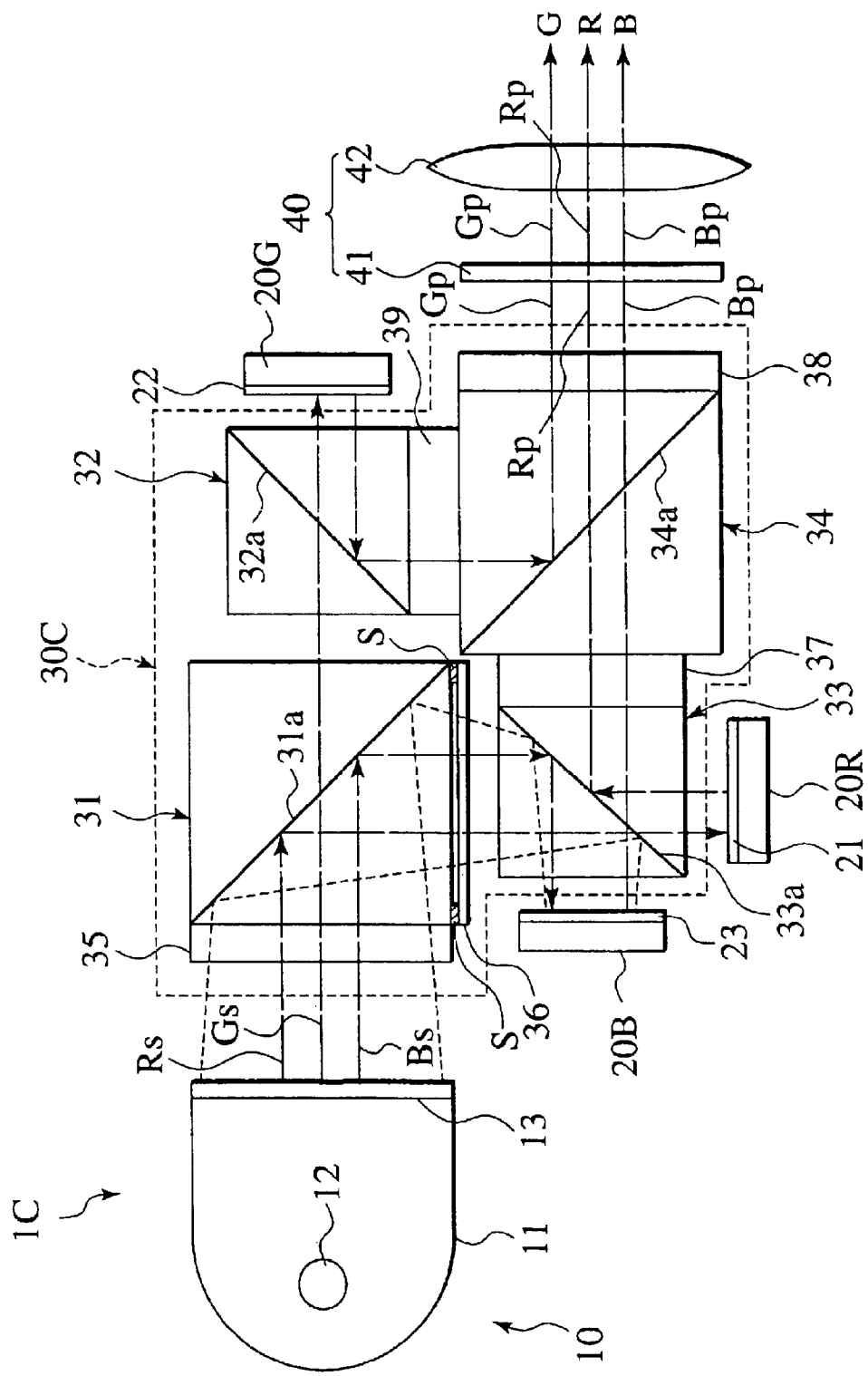
FIG. 8 is a plan view showing a case where Modification Example 1, in which the color separation and color synthesis optical system of the first embodiment according to the present invention is partially modified, is applied to the reflection type projection display apparatus.
Figure 9:
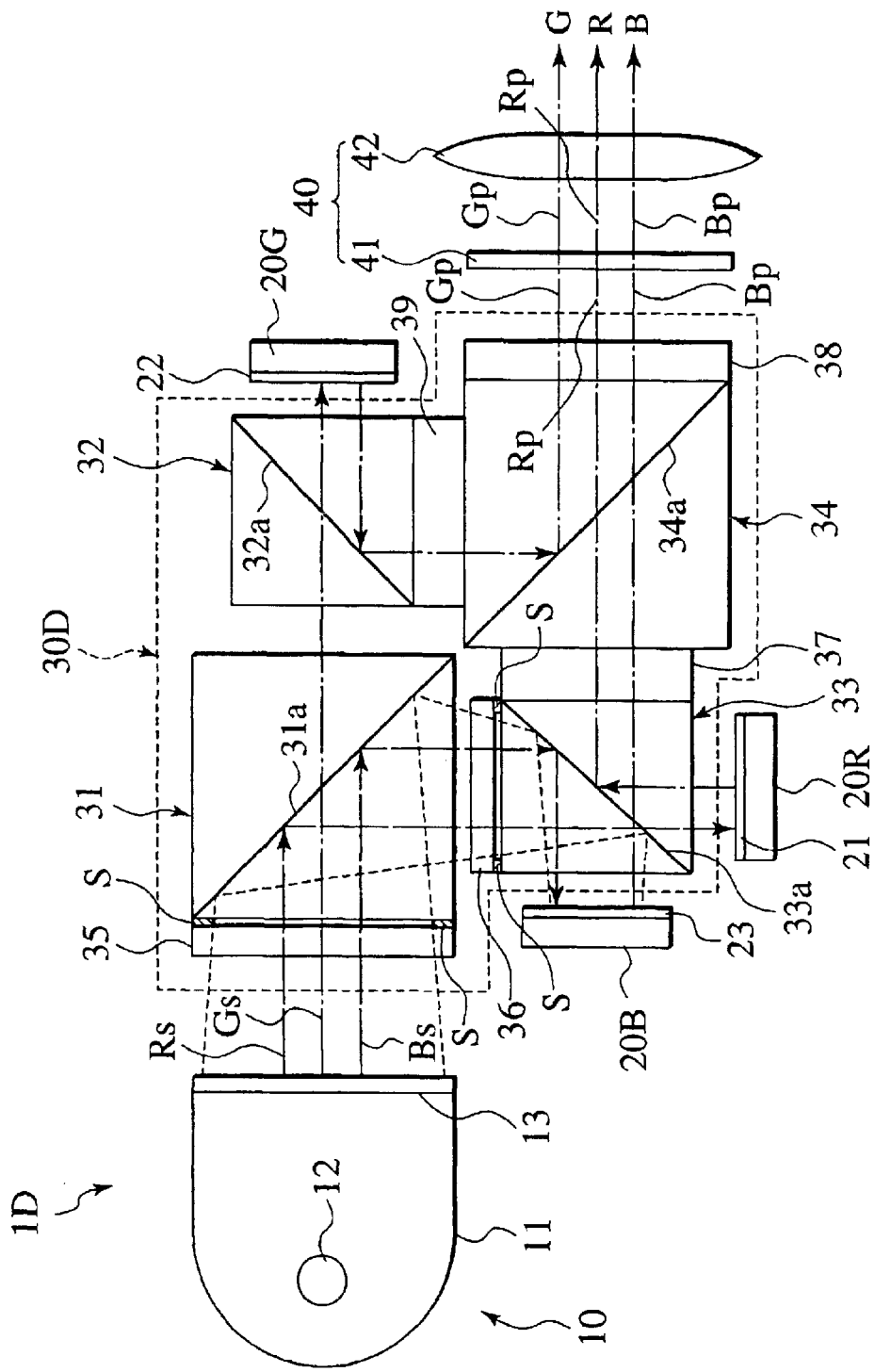
FIG. 9 is a plan view showing a case where Modification Example 2, in which the color separation and color synthesis optical system of the first embodiment according to the present invention is partially modified, is applied to the reflection type projection display apparatus.
Figure 10:
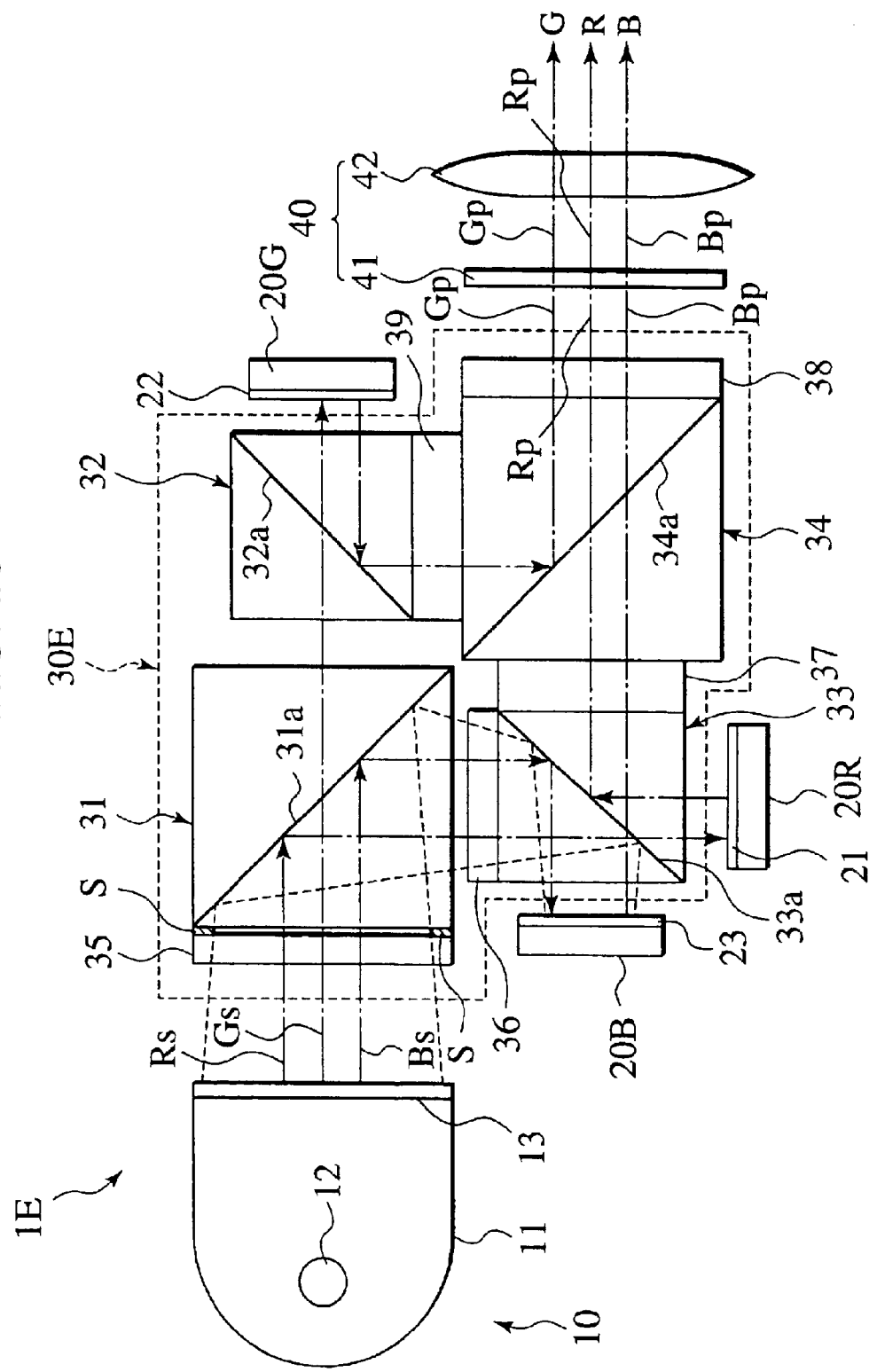
FIG. 10 is a plan view showing a case where Modification Example 3, in which the color separation and color synthesis optical system of the first embodiment according to the present invention is partially modified, is applied to the reflection type projection display apparatus.
Figure 11:
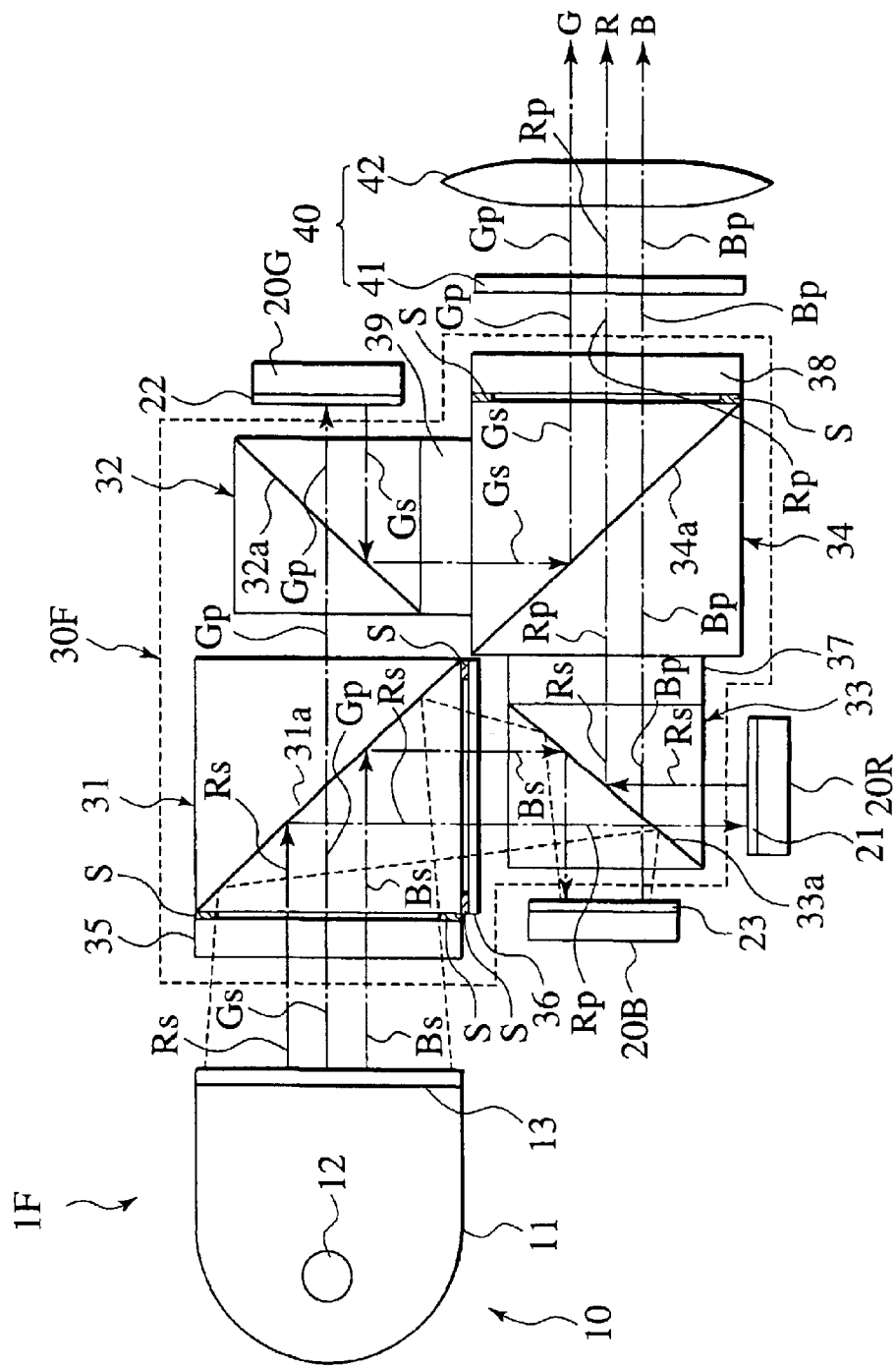
FIG. 11 is a plan view showing a case where Modification Example 4, in which the color separation and color synthesis optical system of the first embodiment according to the present invention is partially modified, is applied to the reflection type projection display apparatus.
Figure 12:
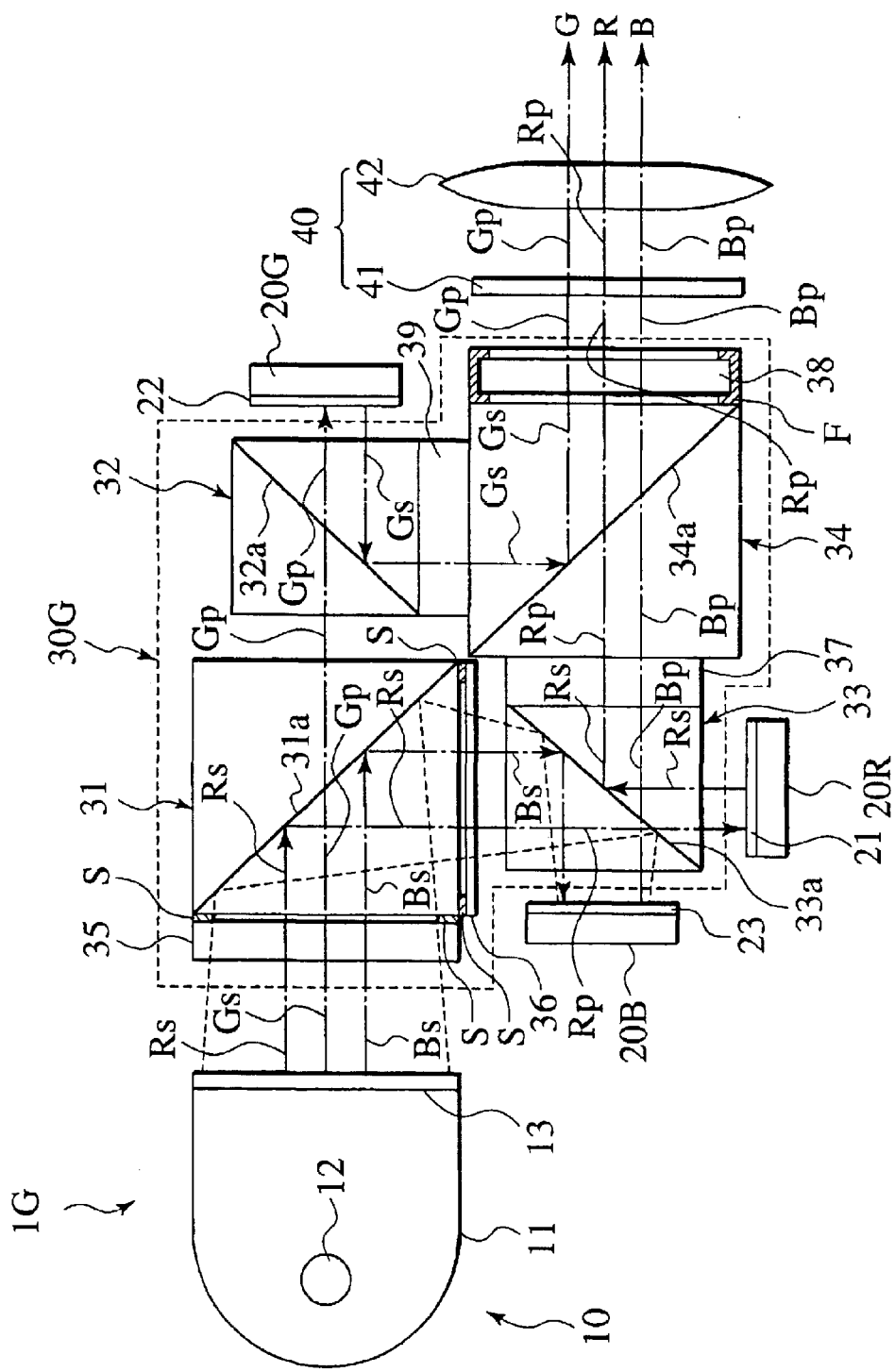
FIG. 12 is a plan view showing a case where Modification Example 5, in which the color separation and color synthesis optical system of the first embodiment according to the present invention is partially modified, is applied to the reflection type projection display apparatus.
Figure 13A:
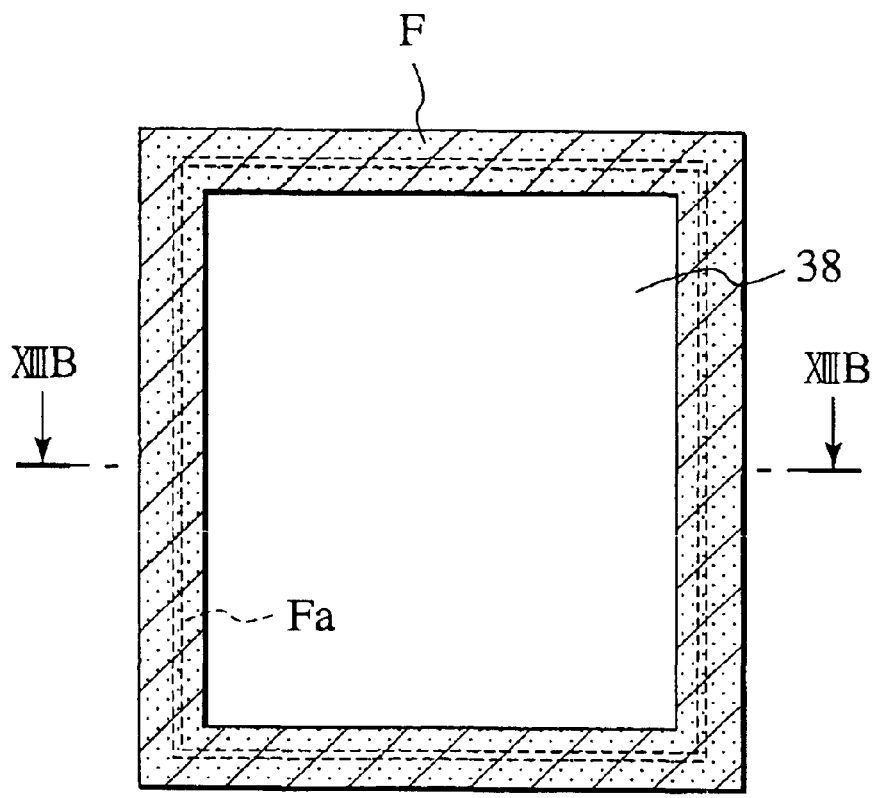
FIG. 13A and FIG. 13B are a front view and a sectional view taken along the line—XIIIB of FIG. 13A showing a state where an external periphery of the wavelength-selective polarization converting plate is supported by a frame in Modification Example 5 in which the color separation and color synthesis optical system of the first embodiment according to the present invention is partially modified.
Figure 13B:
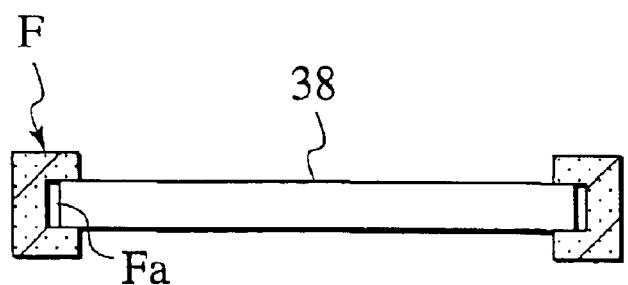

FIG. 8 is a plan view showing a case where Modification Example 1, in which the color separation and color synthesis optical system of the first embodiment according to the present invention is partially modified, is applied to the reflection type projection display apparatus. FIG. 9 is a plan view showing a case where Modification Example 2, in which the color separation and color synthesis optical system of the first embodiment according to the present invention is partially modified, is applied to the reflection type projection display apparatus. FIG. 10 is a plan view showing a case where Modification Example 3, in which the color separation and color synthesis optical system of the first embodiment according to the present invention is partially modified, is applied to the reflection type projection display apparatus. FIG. 11 is a plan view showing a case where Modification Example 4, in which the color separation and color synthesis optical system of the first embodiment according to the present invention is partially modified, is applied to the reflection type projection display apparatus. FIG. 12 is a plan view showing a case where Modification Example 5, in which the color separation and color synthesis optical system of the first embodiment according to the present invention is partially modified, is applied to the reflection type projection display apparatus. FIG. 13A and FIG. 13B are a front view and a sectional view taken along the line XIIIB—XIIIB of FIG. 13A showing a state where an external periphery of the wavelength-selective polarization converting plate is supported by a frame in Modification Example 5 in which the color separation and color synthesis optical system of the first embodiment according to the present invention is partially modified.

First, as shown in FIG. 8, a color separation and color synthesis optical system 30C of Modification Example 1, in which the color separation and color synthesis optical system 30B is partially modified, is constituted so as to be applicable to a reflection type projection display apparatus 1C.

The different things in the color separation and color synthesis optical system 30C of the foregoing Modification Example 1 from the color separation and color synthesis optical system 30B of the first embodiment which was described by use of FIG. 3 will be described. A first polarization beam splitter 31 among first to fourth polarization beam splitters 31 to 34 allows a first wavelength-selective polarization converting plate (phase plate for G color) 35 to closely contact with the left side plane thereof, which is the light incident side from a light source portion 10, and adheres the first wavelength-selective polarization converting plate 35 thereto by light transmissivity adhesive S (not shown). The first polarization beam splitter 31 adheres a second wavelength-selective polarization converting plate (phase plate for R color) 36 to the lower side plate thereof by the light transmissivity adhesive S with a slight gap. Similar to the case in the first embodiment, in Modification Example 1, the first polarization beam splitter 31 is isolated from second to fourth polarization beam splitters 32 to 34, which are united with each other.

At this time, when the second wavelength-selective polarization converting plate (phase plate for R color) 36 is adhered to the lower side plane of the first polarization beam splitter 31, which is located on the light source portion 10 side with the slight gap, the laminate structure form of another example shown in FIG. 5, which is formed by only the polycarbonate laminate body PL, is used as the second wavelength-selective polarization converting plate 36. As shown in the enlarged perspective view of FIG. 6, the light transmissivity adhesive S fills between the positions at the four corners of the external periphery on the lower side plane of the first polarization beam splitter 31 and the positions at the four corners of the external periphery of the second wavelength-selective polarization converting plate 36, which correspond to the positions at the four corners of the external periphery of the lower side plane of the first polarization beam splitter 31, in the form of column of the thickness of, for example, about 0.3 mm and the diameter of, for example, about 1 mm. Thus, the second wavelength-selective polarization converting plate 36 is adhered to the lower side plane of the first polarization beam splitter 31 with a slight gap of about 0.3 mm.

At this time, the light transmissivity adhesive S fills the positions of the four corners of the external periphery of each of the second wavelength-selective polarization converting plate 36 and the first polarization beam splitter 31 as positions where the emission light beam emitted from the lower side plane of the first polarization beam splitter 31 is not disturbed to travel on its optical path. However, the positions filled with the light transmissivity adhesive S are not to be limited to the four corners of the external periphery, and, as shown in the enlarged perspective view of FIG. 7, the adhesion of the second wavelength-selective polarization converting plate 36 and the first polarization beam splitter 31 may be performed by filling the light transmissivity adhesive S at a plurality of positions in the middle points of the external peripheries thereof in the form of column of the thickness of, for example, about 0.3 mm and the diameter of, for example, about 1 mm.

When the second wavelength-selective polarization converting plate 36 is adhered to the lower side plane of the first polarization beam splitter 31 by the light transmissivity adhesive S with a slight gap of about 0.3 mm, the light transmissivity adhesive S has elasticity also in this case. Therefore, the light transmissivity adhesive S absorbs the deformation of the second wavelength-selective polarization converting plate 36 due to the thermal expansion, and suppresses occurrence of a thermal stress in an effective incident area in the second wavelength-selective polarization converting plate 36 onto which the emission light beam from the lower side plane of the first polarization beam splitter 31 is incident. Accordingly, it is possible to suppress the occurrence of the shading for the projected color image.

Next, as shown in FIG. 9, a color separation and color synthesis optical system 30D of Modification Example 2 in which the color separation and color synthesis optical system of the first embodiment is partially modified is constituted so as to be applicable to a reflection type projection display apparatus 1D.

The differences of the color separation and color synthesis optical system 30D of above mentioned Modification Example 2 from that of the first embodiment described by using FIG. 3 will be described. A first polarization beam splitter 31 among the first to fourth polarization beam splitters 31 to 34 adheres a first wavelength-selective polarization converting plate (phase plate for G color) 35 to the left side plane thereof, which is its light emission side from a light source portion 10, by light transmissivity adhesive S with a slight gap. The third polarization beam splitter 33 adheres a second wavelength-selective polarization converting plate (phase plate for R color) 36 to the upper side plane thereof, which is its light emission side from the first polarization beam splitter 31, by the light transmissivity adhesive S with a slight gap. Similar to the case of the first embodiment, in Modification Example 2, the first polarization beam splitter 31 is isolated from second to fourth polarization beam splitters 32 to 34, which are united with each other.

At this time, for the first wavelength-selective polarization converting plate (phase plate for G color) 35 adhered to the left side plane of the first polarization beam splitter 31 and the second wavelength-selective polarization converting plate (phase plate for R color) 36 adhered to the upper side plane of the third polarization beam splitter 33, the structure form which is the example obtained by sandwiching the polycarbonate laminate body PL between the two glass plates G and G, as shown in FIG. 4, is used.

Unlike the first embodiment, by adhering the second wavelength-selective polarization converting plate 36 to the upper side plane of the third polarization beam splitter 33 formed to be smaller than the first polarization beam splitter 31, the color separation and color synthesis optical system 30D of Modification Example 2 is at a slight disadvantage in securing an effective incident area for the emission light beam from the first polarization beam splitter 31. However, since the third polarization beam splitter 33 shows a lower temperature rise than the first polarization beam splitter 31 as described above, the color separation and color synthesis optical system 30D has an advantage that a thermal expansion of the second wavelength selection polarization plate 36 also decreases.

By adhering the external periphery of the first wavelength-selective polarization converting plate 35 to the external periphery of the left side plane of the first polarization beam splitter 31 by the light transmissivity adhesive S with the slight gap at the positions at intervals, and by adhering the external periphery of the second wavelength-selective polarization converting plate 36 to the external periphery of the upper side plane of the third polarization beam splitter 33 at the positions of both of the external peripheries at intervals by the light transmissivity adhesive S with the slight gap, the light transmissivity adhesive S absorbs the deformations of the first and second wavelength-selective polarization converting plates 35 and 36 due to the thermal expansion because the light transmissivity adhesive S has elasticity, and suppresses occurrence of a thermal stress in an effective incident area in each of the first and second wavelength-selective polarization converting plates 35 and 36. Accordingly, it is possible to suppress the occurrence of the shading for the projected color image.

Next, as shown in FIG. 10, a color separation and color synthesis optical system 30E of Modification Example 3 obtained by partially modifying the color separation and color synthesis optical system of the first embodiment is constituted so as to be applicable to a reflection type projection display apparatus 1E.

The differences of the color separation and color synthesis optical system 30E of Modification Example 3 from that of the first embodiment described by use of FIG. 3 will be described. A first polarization beam splitter 31 among the first to fourth polarization beam splitters 31 to 34 adheres a first wavelength-selective polarization converting plate (phase plate for G color) 35 to the left side plane thereof, which is its light emission side from a light source portion 10, by light transmissivity adhesive S with a slight gap. The third polarization beam splitter 33 allows a second wavelength-selective polarization converting plate (phase plate for R color) 36 to closely contact with the upper side plane thereof, which is its light emission side from the first polarization beam splitter 31, adheres the second wavelength-selective polarization converting plate 36 to the upper side plane thereof by light transmissivity adhesive (not shown). Same as the case in the first embodiment, in Modification Example 3, the first polarization beam splitter 31 is isolated from the second to fourth polarization beam splitters 32 to 34 which are united with each other.

At this time, as the first wavelength-selective polarization converting plate 35 adhered to the left side plane of the first polarization beam splitter 31 and the second wavelength-selective polarization converting plate 36 adhered to the upper side plane of the third polarization beam splitter 33, the structure form, which is the example obtained by sandwiching the polycarbonate laminate body PL by the two glass plates G and G as shown in FIG. 4, is used.

By closely contacting and adhering the second wavelength-selective polarization converting plate 36 to the upper side plane of the third polarization beam splitter 33 which is formed to be smaller than the first polarization beam splitter 31, the color separation and color synthesis optical system 30E of Modification Example 3 is at a slight disadvantage in securing an effective incident area for the emission light beam from the first polarization beam splitter 31. However, since the third polarization beam splitter 33 shows a lower temperature rise than the first polarization beam splitter 31 as described above, the color separation and color synthesis optical system 30E has an advantage that a thermal expansion of the second wavelength-selective polarization converting plate 36 also decreases.

By adhering the external periphery of the first wavelength-selective polarization converting plate 35 to the external periphery of the left side plane of the first polarization beam splitter 31 at the positions of both external peripheries at intervals by the light transmissivity adhesive S with the slight gap, and by closely contacting and adhering the second wavelength-selective polarization converting plate 36 to the upper side plane of the third polarization beam splitter 33 by the light transmissivity adhesive (not shown), the light transmissivity adhesive S absorbs the deformations of the first wavelength-selective polarization converting plate 35 due to the thermal expansion because the light transmissivity adhesive S has elasticity, and suppresses occurrence of a thermal stress in an effective incident area in the first wavelength-selective polarization converting plate 35. Accordingly, it is possible to suppress the occurrence of the shading for the projected color image.

Next, as shown in FIG. 11, a color separation and color synthesis optical system 30F of Modification Example 4 obtained by partially modifying the color separation and color synthesis optical system of the first embodiment is constituted so as to be applicable to a reflection type projection display apparatus 1F.

The differences of the color separation and color synthesis optical system 30F of Modification Example 4 from that of the first embodiment described by use of FIG. 3 will be described. A fourth wavelength-selective polarization converting plate 38 provided near a projection optical system 40 is not closely contacted with the right side plane of a fourth polarization beam splitter 34 among first to fourth polarization beam splitters 31 to 34, and the external periphery of the fourth wavelength-selective polarization converting plate 38 is adhered to the external periphery of the right side plane of the fourth polarization beam splitter 34 at the positions of both external peripheries at intervals by light transmissivity adhesive S with a slight gap as shown in FIGS. 6 and 7.

Herein, the structure form obtained by closely contacting the optical glass plates G and G of a thickness of about 0.5 mm to the front and rear planes of the polycarbonate laminate body PL whose thickness is about 1 mm, as described by use of FIG. 4, is used as the fourth wavelength-selective polarization converting plate 38. When the glass plates G and G are poorly flattened and the fourth wavelength-selective polarization converting plate 38 is closely contacted and adhered to the right side plane of the fourth polarization beam splitter 34 by the light transmissivity adhesive, the adhesion plane of the fourth wavelength-selective polarization converting plate 38 undulates owing to the contraction of the light transmissivity adhesive, so that aberration of the projection light beam is caused and deterioration of resolution may occur. In order to avoid this phenomenon, the sum of the thickness of the fourth wavelength-selective polarization converting plate 38 is set to at least 1.5 mm or more in Modification Example 4, and the glass plates G and G are finished to have a good profile regularity. At the same time, the parallel accuracy of the glass plates G and G is increased. Thereafter, the external periphery of the fourth wavelength-selective polarization converting plate 38 is adhered to the external periphery of the right side plane of the fourth polarization beam splitter 34 at the positions of the both external peripheries at intervals by the light transmissivity adhesive S with the slight gap.

Thus, since the light transmissivity adhesive S absorbs the deformation of the fourth wavelength-selective polarization converting plate 38 due to its thermal expansion and suppresses the occurrence of the thermal stress in the effective incident area of the fourth wavelength-selective polarization converting plate 38, the color separation and color synthesis optical system of Modification Example 4 can suppress occurrence of shading for the projected color image.

Furthermore, when a color-synthesized light beam obtained by color-synthesizing the color light beams from the reflection type liquid crystal panels 20R, 20G and 20B travels toward the projection lens 42, a phenomenon in which the color light beams reflect at the interface of the fourth wavelength-selective polarization converting plate 38 exposed to the air and return to the reflective type liquid crystal panels 20R, 20G and 20B is suppressed by applying a reflection reduction coating onto the interface of the fourth wavelength-selective polarization converting plate 38. Thus, it is possible to suppress the decrease of a contrast ratio due to the reflection light beam at the interface of the fourth wavelength-selective polarization converting plate 38, making it possible to project a high quality color image on a screen.

Next, as shown in FIG. 12, a color separation and color synthesis optical system 30G of Modification Example 5 obtained by partially modifying the color separation and color synthesis optical system of the first embodiment is constituted so as to be applicable to a reflection type projection display apparatus 1G.

The differences of the color separation and color synthesis optical system 30G of Modification Example 5 from that of the first embodiment described by use of FIG. 3 will be described. A fourth wavelength-selective polarization converting plate 38 provided near a projection optical system 40 is not closely contacted with the right side plane of a fourth polarization beam splitter 34 among first to fourth polarization beam splitters 31 to 34, and the external periphery of the fourth wavelength-selective polarization converting plate 38 is supported by a frame F. This frame F is fixed along the external periphery of the right side plane of the fourth wavelength-selective polarization converting plate 38 by adhesive.

To be more specific, the frame F shown in FIGS. 13A and 13B frames the external periphery of the fourth wavelength-selective polarization converting plate 38 rectangularly. A concaved groove Fa having a width larger than a thickness of the fourth wavelength-selective polarization converting plate 38 is formed inside the frame F, and the external periphery of the fourth wavelength-selective polarization converting plate 38 is inserted in the concaved groove Fa, thus framing the external periphery of the fourth wavelength-selective polarization converting plate 38. At this time, the dimensions of the fourth wavelength-selective polarization converting plate 38 in the lateral and longitudinal directions are set so that the fourth wavelength-selective polarization converting plate 38 is inserted in the groove Fa with a clearance.

Thus, when the fourth wavelength-selective polarization converting plate 38 thermally expands, the fourth wavelength-selective polarization converting plate 38 can extend in its plane direction inside the frame F, so that an internal stress is never accumulated in the fourth wavelength-selective polarization converting plate 38. Accordingly, it is possible to prevent a phenomenon in which shading occurs by a partial change of a phase characteristic due to the internal stress.

At this time, in order to prevent jounce of the external periphery of the fourth wavelength-selective polarization converting plate 38 in the concaved groove Fa of the frame F, the external periphery of the fourth wavelength-selective polarization converting plate 38 may be fitted with a thin rubber member, a plastic film or the like, which freely makes an elastic deformation. In addition, the external periphery of the fourth wavelength-selective polarization converting plate 38 may be thrust into one side of the concaved groove Fa of the frame F by use of a thin leaf spring or the like.

Furthermore, in Modification Example 5, since the fourth wavelength-selective polarization converting plate 38 is provided so as to be apart from the right side plane of the fourth polarization beam splitter 34 with the slight gap, by applying a reflection reduction coating onto the interface of the fourth wavelength-selective polarization converting plate 38, similar to the Modification Example 4, it is possible to suppress a phenomenon in which, when a color-synthesized light beam obtained by color-synthesizing the color light beams from the reflection type liquid crystal panes 20R, 20G and 20B travels toward the projection lens 42, the color light beams reflect at the interface of the fourth wavelength-selective polarization converting plate 38 exposed to the air and return to the reflective type liquid crystal panels 20R, 20G and 20B. Thus, it is possible to suppress the decrease of a contrast ratio due to the reflection light beam at the interface of the fourth wavelength-selective polarization converting plate 38, making it possible to project a high quality color image on a screen.

A structure may be adopted, in which the external periphery of the first wavelength-selective polarization converting plate 35 provided near the light source portion 10 is supported by the frame F and the frame F is fixed along the external periphery of the left side plane of the first polarization beam splitter 31 by use of adhesive.

<Second Embodiment>

Figure 14:
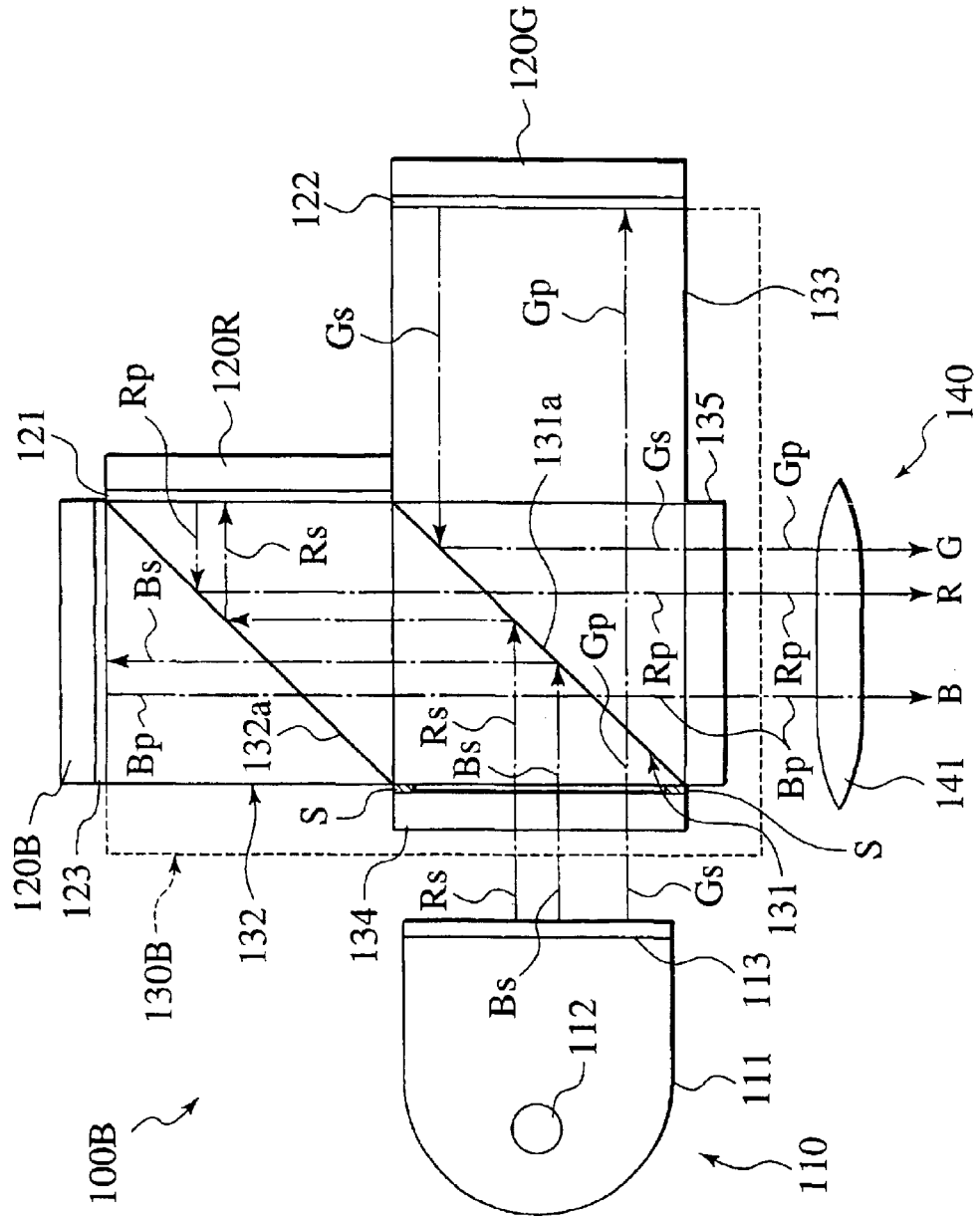
FIG. 14 is a plan view showing a case where a color separation and color synthesis optical system of a second embodiment according to the present invention is applied to the reflection type projection display apparatus.

FIG. 14 is a plan view showing a case where a color separation and color synthesis optical system of a second embodiment according to the present invention is applied to the reflection type projection display apparatus.

Figure 2:
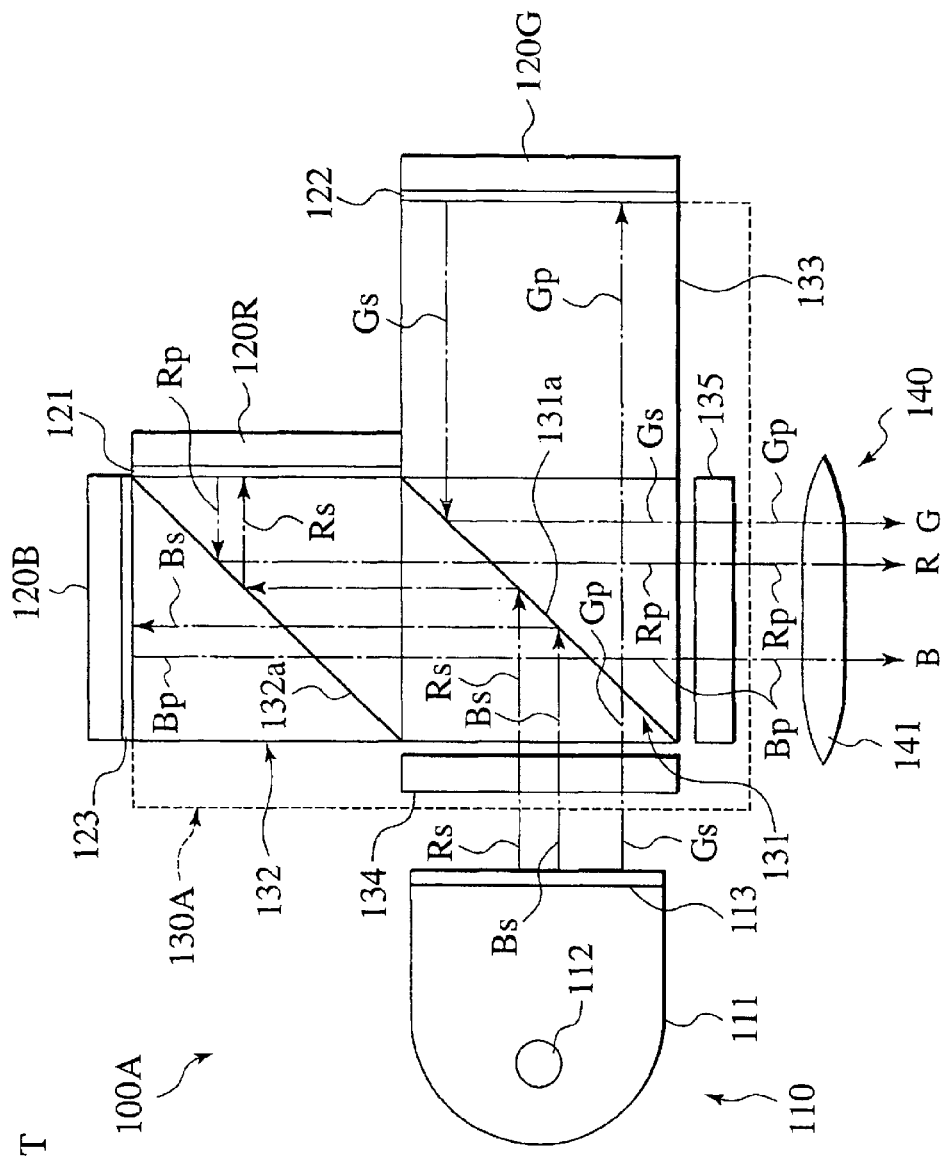
FIG. 2 is a plan view showing an optical structure of a color separation and color synthesis optical system applied to a reflection type projection display apparatus which is another conventional example disclosed by Colorlink. Inc.

The color separation and color synthesis optical system 130B of the second embodiment according to the present invention shown in FIG. 14 is obtained by partially modifying the color separation and color synthesis optical system 130A of the conventional another example described in FIG. 2. For the sake of explanation, the same reference numerals and symbols are appended to constituent components of the color separation and color synthesis optical system 130B, which have the same functions as those of the constituent components of the color separation and color synthesis optical system 130A described in the conventional example, and descriptions for them will be described appropriately. New reference numerals and symbols are appended to constituent components different from those of the conventional example, and descriptions for them will be performed.

As shown in FIG. 14, the color separation and color synthesis optical system 130B of the second embodiment according to the present invention is applied to a reflection type projection display apparatus 100B.

The reflection type projection display apparatus 100B is constituted of a light source portion 110 for emitting a white light beam; a color separation and color synthesis optical system 130B, which color-separates the white light beam emitted from the light source portion 110 into three primary color light beams of R (red), G (green) and B (blue), guides the three primary color light beams into three spatial light modulators (hereinafter, referred to as a reflection type liquid crystal panel) 120R, 120G and 120B corresponding to R, G and B, and emits a color-synthesized light beam obtained by color-synthesizing the three primary color light beams after the three primary color light beams are optically modulated by the spatial light modulators 120R, 120G and 120B depending on video signals; and a projection optical system 140 for projecting the color-synthesized light beam emitted from the color separation and color synthesis optical system 130B. The light source portion 110 comprising a reflection plane mirror 111, a light source 112 and a polarization plate 113, and the projection optical system 140 comprising a projection lens 141 are quite the same as those in the conventional examples, and detailed descriptions for them are omitted.

Specifically, the color separation and color synthesis optical system 130B of the second embodiment is also provided between the light source portion 110 and the projection optical system 140, and the color separation and color synthesis optical system 130B surrounded by the dotted lines in FIG. 14 is provided with one polarization beam splitter 131 formed to a rectangular parallelepiped shape (including a regular hexahedron shape); one dichroic prism 132 formed to a rectangular parallelepiped shape (including a regular hexahedron shape); an optical glass block 133 formed to a rectangular parallelepiped shape (including a regular hexahedron shape); and two, first and second, wavelength-selective polarization converting plates 134 and 135 each formed to a plane shape. The color separation and color synthesis optical system 130B is constituted similar to that of the conventional example shown in FIG. 2.

The following things are also true in the second embodiment as well as in the conventional example shown in FIG. 2. Specifically, a reflection type liquid crystal panel 120R for R color, which is fitted with a quarter wave plate 121, is located on the right plane side of the dichroic prism 132 so as to face thereto, and a reflection type liquid crystal panel 120B for B color, which is fitted with a quarter wave plate 123, is located on the upper plane side of the dichroic prism 132 so as to face thereto. A reflection type liquid crystal panel 120G for G color, which is fitted with a quarter wave plate 122, is located on the right plane side of the optical glass block 133 so as to face thereto.

Herein, the differences of the color separation and color synthesis optical system 130B of the second embodiment from that of the conventional example shown in FIG. 2 will be described. The polarization beam splitter 131 adheres the first wavelength-selective polarization converting plate (phase plate for G color) 134 on the left side plane thereof, which is a light incident side from the light source portion 10, by light transmissivity adhesive S with a slight gap. The polarization beam splitter 131 closely contacts with the second wavelength-selective polarization converting plate (phase plate for G color) 135 thereto, and adheres the second wavelength-selective polarization converting plate 135 thereto by light transmissivity adhesive (not shown).

Also in this second embodiment, when the temperature of the polarization beam splitter 131, the dichroic prism 132 and the optical glass block 133 was measured in the color separation and color synthesis optical system 130B in order to investigate the cause of occurrence of shading in the projected color image, the temperature of the polarization beam splitter 131 onto which all of the three primary color light beams before color separation was highest because light energy was highest on the side onto which the white color light beam from the light source portion 110 is incident. The temperature of the dichroic prism 132 onto which the B color light beam is incident was second highest, and the temperature of the optical glass block 133 onto which the G color light beam is incident was the third.

Based on the measurement result of the temperature, the following fact was proved. Specifically, the first wavelength-selective polarization converting plate (phase plate for G color) 134 located between the light source portion 110 and the left side plane of the polarization beam splitter 131 causes a deformation due to the difference of a thermal expansion for the polarization beam splitter 131 showing a large temperature rise, and evenness is apt to be lowered. This causes shading for the projected color image.

Accordingly, when the first wavelength-selective polarization converting plate (phase plate for G color) 134 is adhered with a slight gap to the left side plane of the polarization beam splitter 131 located on the light source portion 110 side, the structure form that is the example in which the polycarbonate laminate body PL is sandwiched by the two glass plates G and G shown in FIG. 4 is used as the first wavelength-selective polarization converting plate 134. Similar to the descriptions of the first embodiment in which FIG. 6 and FIG. 7 were used, the light transmissivity adhesive S fills between the positions at the four corners of the external periphery of the first wavelength polarization conversion plate 134 and the positions at the four corners of the external periphery of the left side plane of the polarization beam splitter 131, which correspond to the positions at the four corners of the external periphery of the first wavelength polarization conversion plate 134, in the form of column of the thickness of, for example, about 0.3 mm and the diameter of, for example, about 1 mm. Thus, the first wavelength-selective polarization converting plate 134 is adhered to the left side plane of the polarization beam splitter 131 with a slight gap of about 0.3 mm.

At this time, since the light transmissivity adhesive S has the elasticity, the light transmissivity adhesive S absorbs a deformation of the first wavelength-selective polarization converting plate 134 due to a thermal expansion, and suppresses occurrence of a thermal stress in an effective incident area in the first wavelength-selective polarization converting plate 134 onto which the white light beam from the light source portion 110 is incident. Accordingly, it is possible to suppress occurrence of shading for the projected color image.

Since the operation of the color separation and color synthesis optical system 130B of the second embodiment according to the present invention constituted as set out above is the same as that of the conventional example shown in FIG. 2 with respect to the functions of the constituent components, the diagram of the optical paths for the R, G and B color light beams is illustrated in FIG. 14. Refer to the descriptions of the conventional example shown in FIG. 2 for detailed descriptions of the conventional example.

Accordingly, Modification Examples 1 and 2 in which the color separation and color synthesis optical system 100B of the second embodiment according to the present invention is partially modified will be briefly described with reference to FIGS. 15 and 16 while focusing on differences from the color separation and color synthesis optical system 100B of the second embodiment.

Figure 15:
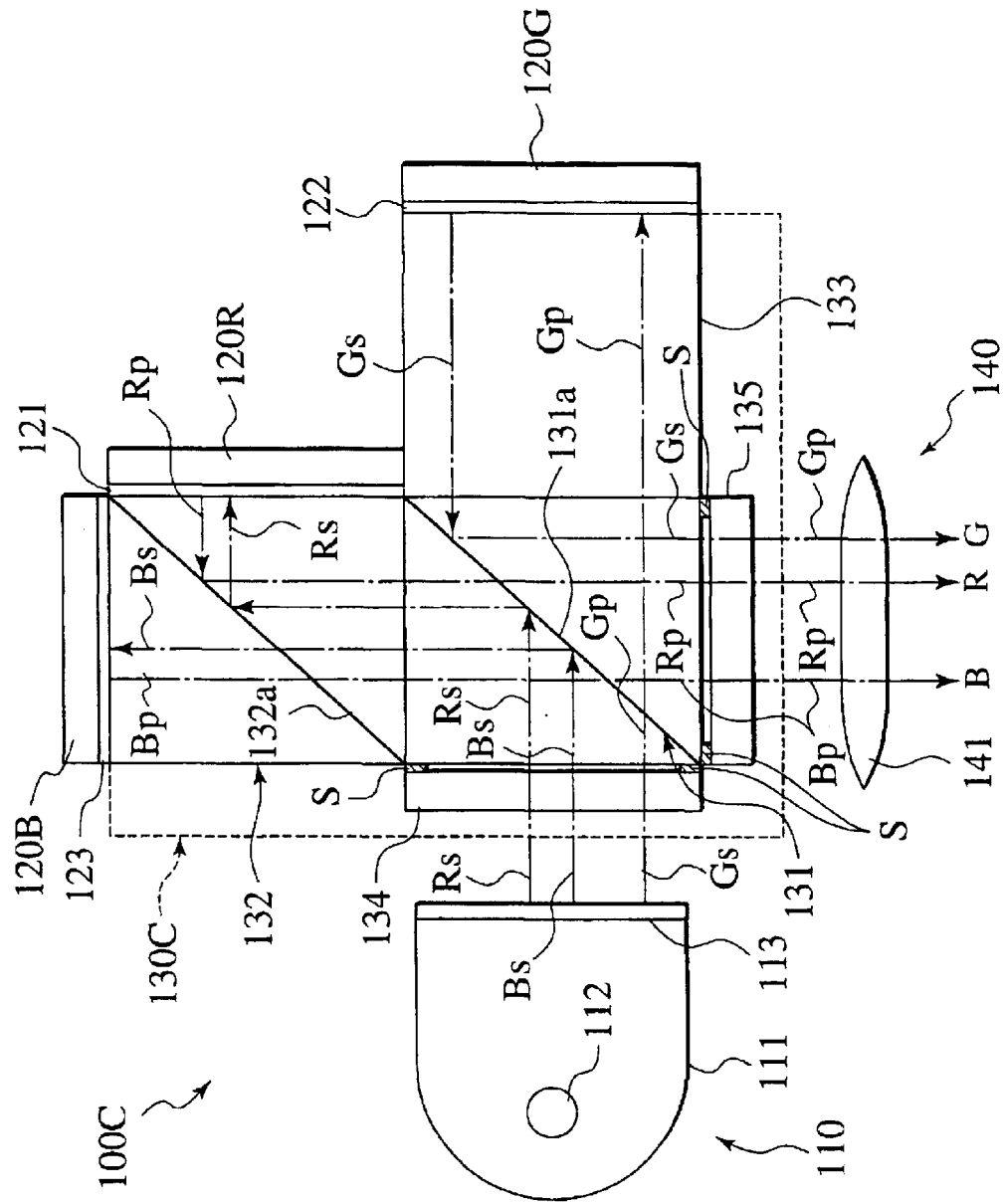
FIG. 15 is a plan view showing a case where Modification Example 1, in which the color separation and color synthesis optical system of the second embodiment according to the present invention is partially modified, is applied to the reflection type projection display apparatus.
Figure 16:
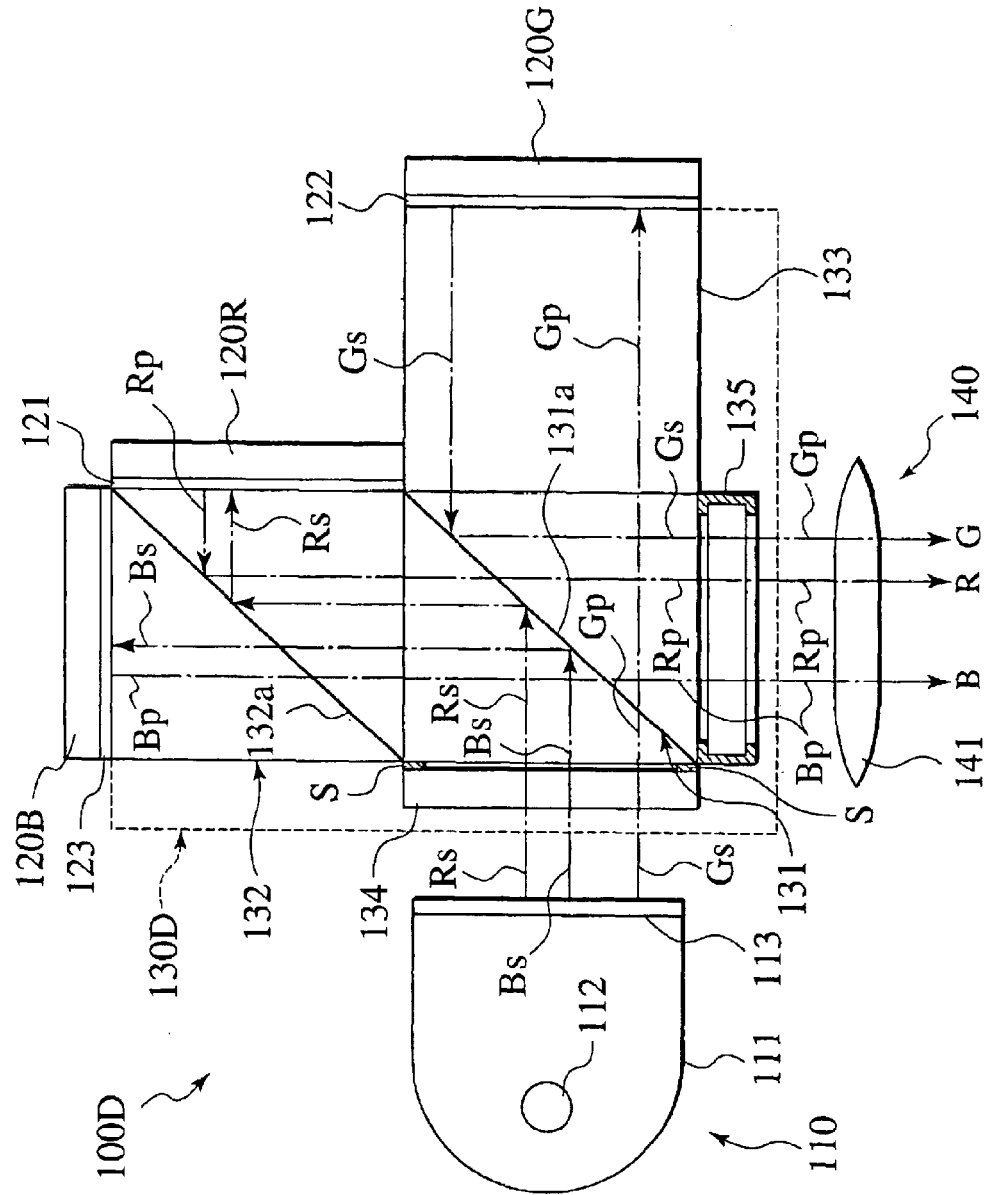
FIG. 16 is a plan view showing a case where Modification Example 2, in which the color separation and color synthesis optical system of the second embodiment according to the present invention is partially modified, is applied to the reflection type projection display apparatus.

FIG. 15 is a plan view showing a case where Modification Example 1, in which the color separation and color synthesis optical system of the second embodiment according to the present invention is partially modified, is applied to the reflection type projection display apparatus FIG. 16 is a plan view showing a case where Modification Example 2, in which the color separation and color synthesis optical system of the second embodiment according to the present invention is partially modified, is applied to the reflection type projection display apparatus.

First, as shown in FIG. 15, the color separation and color synthesis optical system 130C of Modification Example 1 in which the color separation and color synthesis optical system of the second embodiment according to the present invention is partially modified is constituted so as to be applicable to the reflection type projection display apparatus 100C.

The difference of the color separation and color synthesis optical system 130C of Modification Example 1 from that of the second embodiment described by use of FIG. 14 will be described. A second wavelength-selective polarization converting plate 135 is not closely contacted with the lower side plane of a polarization beam splitter 131, which is a light beam emission side, and the external periphery of the second wavelength-selective polarization converting plate 135 is adhered to the external periphery of the lower side plane of the polarization beam splitter 131 at the positions of both external peripheries at intervals by light transmissivity adhesive S with a slight gap.

With such structure of the color separation and color synthesis optical system 130C, similar to Modification Example 4 of the first embodiment described by use of FIG. 11, the light transmissivity adhesive S absorbs a deformation due to a thermal expansion in an effective incident area of the second wavelength-selective polarization converting plate 135, and suppresses occurrence of a thermal stress in the effective incident area of the second wavelength-selective polarization converting plate 135. Therefore, it is possible to suppress occurrence of shading for a projected color image. At this time, since the polarization beam splitter 131 serves as both the light incident and emission sides, a high temperature of the polarization beam splitter 131 having a large amount of heat is hardly transmitted to the second wavelength-selective polarization converting plate 135. Therefore, it is possible to suppress the thermal expansion of the second wavelength-selective polarization converting plate 135.

Furthermore, when a color-synthesized light beam obtained by color-synthesizing the color light beams from the reflection type liquid crystal panels 120R, 120G and 120B travels toward the projection lens 141, a phenomenon in which the color light beams reflect at the interface of the second wavelength-selective polarization converting plate 135 exposed to the air and return to the reflective type liquid crystal panels 120R, 120G and 120B is suppressed by applying a reflection reduction coating onto the interface of the second wavelength-selective polarization converting plate 135. Thus, it is possible to suppress the decrease of a contrast ratio due to the reflection light beam at the interface of the second wavelength-selective polarization converting plate 135, making it possible to project a high quality color image on a screen.

Next, as shown in FIG. 16, the color separation and color synthesis optical system 130D of Modification Example 2 in which the color separation and color synthesis optical system of the second embodiment is partially modified is constituted so as to be applicable to the reflection type projection display apparatus 100D.

The differences of the color separation and color synthesis optical system 130D of Modification Example 2 from that of the second embodiment described by use of FIG. 14 will be described. A second wavelength-selective polarization converting plate 135 is not closely contacted with the lower side plane of a polarization beam splitter 131, which is a light emission side, and the external periphery of the second wavelength-selective polarization converting plate 135 is supported by a frame F. This frame F is fixed along the external periphery of the lower side plane of the polarization beam splitter 131 by adhesive.

With such structure of the color separation and color synthesis optical system 130D of Modification Example 2, similar to Modification Example 5 of the first embodiment described by use of FIG. 12, when the second wavelength-selective polarization converting plate 135 thermally expands, the second wavelength-selective polarization converting plate 135 can extend in its plane direction inside the frame F, so that an internal stress is never accumulated in the second wavelength-selective polarization converting plate 135. Accordingly, it is possible to prevent phenomenon in which shading occurs by a partial change of a phase characteristic due to the internal stress.

Furthermore, the second wavelength-selective polarization converting plate 135 is provided at the position separated from the lower side plane of the polarized light beams splitter 131 with a slight gap by a frame F in Modification Example 2. Accordingly, similar to Modification Example 1, also in Modification Example 2, when a color-synthesized light beam obtained by color-synthesizing the color light beams from the reflection type liquid crystal panels 120R, 120G and 120B travels toward the projection lens 141, a phenomenon in which the color light beams reflect at the interface of the second wavelength-selective polarization converting plate 135 exposed to the air and return to the reflective type liquid crystal panels 120R, 120G and 120B is suppressed by applying a reflection reduction coating onto the interface of the second wavelength-selective polarization converting plate 135. Thus, it is possible to suppress the decrease of a contrast ratio due to the reflection light beam at the interface of the second wavelength-selective polarization converting plate 135, making it possible to project a high quality color image on a screen.

A structure may be adopted, in which the external periphery of the first wavelength-selective polarization converting plate 134 provided near the light source portion 110 is supported by the frame F and the frame F is fixed along the external periphery of the left side plane of the polarization beam splitter 131 by use of adhesive.

The cases where the white light beam emitted from the light source portion 110 is color-separated into the three primary color light beam were described for the color separation and color synthesis optical system 30B of the first embodiment, the color separation and color synthesis optical systems 30C to 30G of Modification Examples 1 to 5 obtained by partially modifying the color separation and color synthesis optical system 30 B of the first embodiment, the color separation and color synthesis optical system 130B of the second embodiment, and the color separation and color synthesis optical systems 130C to 130D of Modification Examples 1 and 2 obtained by partially modifying the color separation and color synthesis optical system 130B of the second embodiment have been described above. However, the structure of the color separation and color synthesis optical system is not limited to the above. The present invention can be applied to the case where the white light beams emitted from the light source portions 10 and/or 110 are color-separated to color light beams of at least two colors or more. Also in this case, at least one wavelength-selective polarization converting plate which rotates the plane of polarization of a specific color light beam by 90 degrees may be located in the color separation and color synthesis optical system, and this wavelength-selective polarization converting plate may be adhered to the incidence plane and/or the emission plane of the polarization beam splitter by adhesive with a slight gap.

Furthermore, the light transmissivity adhesive S used in the first and second embodiments should be as transparent as possible to suppress thermal absorption by light radiation. However, the light transmissivity adhesive S is used for adhering the external periphery of the wavelength-selective polarization converting plate and the external periphery of the polarization beam splitter to each other, and consequently the light transmissivity adhesive S does not always need to have light transmissivity.

Still furthermore, it is possible for the wavelength-selective polarization converting plate used in the first and second embodiment to increase a utilization ratio of light by applying the reflection reduction coating onto the plane thereof exposed to the air.

In the color separation and color synthesis optical system and the reflection type projection display apparatus according to the present invention above described in detail, since the adhesive has elasticity, the adhesive absorbs the deformation of the wavelength-selective polarization converting plate due to its thermal expansion, and suppresses the occurrence of the thermal stress in the effective incident area of the wavelength-selective polarization converting plate. Therefore, the occurrence of shading for the projected color image can be suppressed.

By adhering the external periphery of the wavelength selection conversion plate or that of the frame to the external periphery of the incidence plane or emission plane at the positions of both of the external peripheries at intervals by the adhesive, the high temperature of the polarization beam splitter having a large amount of heat is hardly transmitted to the wavelength-selective polarization converting plate. Therefore, the thermal expansion of the wavelength-selective polarization converting plate is suppressed, and the occurrence of shading for the projected color image can be suppressed.

By supporting the wavelength-selective polarization converting plate by the frame, when the wavelength-selective polarization converting plate thermally expands, the wavelength-selective polarization converting plate can extend in its plane direction inside the frame, so that the internal stress is never accumulated in the wavelength-selective polarization converting plate. Accordingly, it is possible to prevent the phenomenon in which shading occurs by the partial change of the phase characteristic due to the internal stress.

Furthermore, when the color-synthesized light beam travels toward the projection lens, the phenomenon in which the color light beams reflect at the interface of the wavelength-selective polarization converting plate exposed to the air and return to the spatial light modulators for the respective colors is suppressed by applying the reflection reduction coating onto the interface of the wavelength-selective polarization converting plate. Thus, it is possible to suppress the decrease of the contrast ratio due to the reflection light beam at the interface of the wavelength-selective polarization converting plate, making it possible to project the high quality color image on the screen.

It should be understood that many modifications and adaptations of the invention will become apparent to those skilled in the art and it is intended to encompass such obvious modifications and changes in the scope of the claims appended hereto.

What is claimed is:

1. A color separation and color synthesis optical system provided between a light source portion and a projection optical system in a reflection type projection display apparatus including the light source portion, a plurality of spatial light modulators and the projection optical system, the color separation and color synthesis optical system, comprising:
   a color separation optical system including a first polarization beam splitter for color-separating a white light beam emitted from the light source portion into a plurality of color light beams;
   a color synthesis optical system including a second polarization beam splitter for color-synthesizing the color light beams emitted from the plurality of spatial light modulators and emitting a color-synthesized light beam; and
   a wavelength-selective polarization converting plate which rotates a plane of polarization of a specific color light beam by 90 degrees, the wavelength-selective polarization converting plate being transparent and adhered to at least one of incidence and emission planes, onto/from which a light beam is incident/emitted, of at least one of the first and second polarization beam splitters, with a small gap by adhesive,
   wherein an external periphery of the wavelength-selective polarization converting plate and an external periphery of the at least one of the incidence and emission planes are adhered by speckles of adhesive.

2. The color separation and color synthesis optical system according to claim 1, wherein a reflection reduction coating is applied to a plane of the wavelength-selective polarization converting plate exposed to the air.

3. The color separation and color synthesis optical system according to claim 1, wherein thickness of the adhesive ranges from 0.2 mm to 0.5 mm.

4. The color separation and color synthesis optical system according to claim 1, wherein shore hardness of the adhesive ranges from 30 to 70.

5. A color separation and color synthesis optical system provided between a light source portion and a projection optical system in a reflection type projection display apparatus including the light source portion, a plurality of spatial light modulators and the projection optical system, the color separation and color synthesis optical system comprising:
   a color separation optical system including a first polarization beam splitter for color-separating a white light beam emitted from the light source portion into a plurality of color light beams;
   a color synthesis optical system including a second polarization beam splitter for color-synthesizing the color light beams emitted from the plurality of spatial light modulators and emitting a color-synthesized light beam;
   a wavelength-selective polarization converting plate which rotates a plane of polarization of a specific color light beam by 90 degrees, the wavelength-selective polarization converting plate being transparent; and
   a frame which supports the wavelength-selective polarization converting plate, the frame being adhered to at least one of incidence and emission planes, onto/from which a light beam is incident/emitted, of at least one of the first and second polarization beam splitters by adhesive,
   wherein an external periphery of the frame and an external periphery of the at least one of the incidence and emission planes are adhered by speckles of adhesive.

6. The color separation and color synthesis optical system according to claim 5, wherein a reflection reduction coating is applied to a plane of the wavelength-selective polarization converting plate exposed to the air.

7. The color separation and color synthesis optical system according to claim 5, wherein the thickness of the adhesive ranges from 0.2 mm to 0.5 mm.

8. The color separation and color synthesis optical system according to claim 5, wherein shore hardness of the adhesive ranges from 30 to 70.

9. The color separation and color synthesis optical system according to claim 5, wherein the frame has a concaved groove for supporting the external periphery of the wavelength-selective polarization converting plate which has a clearance between an end thereof and a bottom of the concaved groove to allow a thermal expansion of the wavelength-selective polarization converting plate in lateral and longitudinal directions.

10. A reflection type projection display apparatus comprising:
   a light source portion;
   a color separation optical system including a first polarization beam splitter for color-separating a white light beam emitted from the light source portion into a plurality of color light beams;
   a plurality of spatial light modulators for optically modulating the plurality of color light beams depending on video signals;
   a color synthesis optical system including a second polarization beam splitter for color-synthesizing the color light beams emitted from the plurality of spatial light modulators and emitting a color-synthesized light beam;

a wavelength-selective polarization converting plate which rotates a plane of polarization of a specific color light beam by 90 degrees, the wavelength-selective polarization converting plate being transparent and adhered to at least one of incidence and emission planes, onto/from which alight beam is incident/emitted, of at least one of the first and second polarization beam splitters, with a small gap by adhesive; and a projection optical system for projecting the color-synthesized light beam emitted from the color synthesis optical system, wherein an external periphery of the wavelength-selective polarization converting plate and an external periphery of the at least one of the incidence and emission planes are adhered by speckles of adhesive.

11. The reflection type projection display apparatus according to claim 10, wherein a reflection reduction coating is applied to a plane of the wavelength-selective polarization converting plate exposed to the air.

12. The color separation and color synthesis optical system according to claim 10, wherein thickness of the adhesive ranges from 0.2 mm to 0.5 mm.

13. The color separation and color synthesis optical system according to claim 10, wherein shore hardness of the adhesive ranges from 30 to 70.

14. A reflection type projection display apparatus comprising:

a light source portion;

a color separation optical system including a first polarization beam splitter for color-separating a white light beam emitted from the light source portion into a plurality of color light beams;

a plurality of spatial light modulators for optically modulating the plurality of color light beams depending on video signals;

a color synthesis optical system including a second polarization beam splitter for color-synthesizing the color light beams emitted from the plurality of spatial light modulators and emitting a color-synthesized light beam;

a wavelength-selective polarization converting plate which rotates a plane of polarization of a specific color light beam by 90 degrees, the wavelength-selective polarization converting plate being transparent;

a frame for supporting the wavelength-selective polarization converting plate; and a projection optical system for projecting the color-synthesized light beam emitted from the color synthesis optical system, wherein an external periphery of the frame and an external periphery of at least one of the incidence and emission planes, onto/from which a light beam is incident/emitted, of at least one of the first and second polarization beam splitters, are adhered by speckles of adhesive.

15. The reflection type projection display apparatus according to claim 14, wherein a reflection reduction coating is applied to a plane of the wavelength-selective polarization converting plate exposed to the air.

16. The color separation and color synthesis optical system according to claim 14, wherein thickness of the adhesive ranges from 0.2 mm to 0.5 mm.

17. The color separation and color synthesis optical system according to claim 14, wherein shore hardness of the adhesive ranges from 30 to 70.

18. The color separation and color synthesis optical system according to claim 14, wherein the frame has a concaved groove for supporting the external periphery of the wavelength-selective polarization converting plate which has a clearance between and end thereof and a bottom of the concaved groove to allow a thermal expansion of the wavelength-selective polarization converting plate in lateral and longitudinal directions.

* * * * *

UNITED STATES PATENT AND TRADEMARK OFFICE
CERTIFICATE OF CORRECTION

PATENT NO. : 6,819,497 B2
DATED : November 16, 2004
INVENTOR(S) : Suzuki et al.

It is certified that error appears in the above-identified patent and that said Letters Patent is hereby corrected as shown below:

Column 35,
Line 9, please delete "alight" and replace with -- a light --

Column 36,
Line 35, please delete "and" and replace with -- an --

Signed and Sealed this

Twenty-second Day of February, 2005

JON W. DUDAS
*Director of the United States Patent and Trademark Office*